United States Patent
Kouno

(10) Patent No.: US 8,072,868 B2
(45) Date of Patent: Dec. 6, 2011

(54) OPTICAL PICKUP AND INFORMATION DEVICE FOR REDUCING AN INFLUENCE OF STRAY LIGHT IN AN INFORMATION RECORDING MEDIUM

(75) Inventor: Akira Kouno, Saitama (JP)

(73) Assignee: Pioneer Corporation, Tokyo (JP)

(*) Notice: Subject to any disclaimer, the term of this patent is extended or adjusted under 35 U.S.C. 154(b) by 394 days.

(21) Appl. No.: 12/295,077

(22) PCT Filed: Mar. 29, 2007

(86) PCT No.: PCT/JP2007/056927
§ 371 (c)(1),
(2), (4) Date: Dec. 29, 2008

(87) PCT Pub. No.: WO2007/114280
PCT Pub. Date: Oct. 11, 2007

(65) Prior Publication Data
US 2009/0274031 A1    Nov. 5, 2009

(30) Foreign Application Priority Data
Mar. 30, 2006   (JP) ................. 2006-095904

(51) Int. Cl.
*G11B 7/135* (2006.01)

(52) U.S. Cl. .................. 369/112.19; 369/112.03

(58) Field of Classification Search .............. None
See application file for complete search history.

(56) References Cited

U.S. PATENT DOCUMENTS

| 4,273,998 | A | * | 6/1981 | Kanamaru | 250/204 |
|---|---|---|---|---|---|
| 5,663,940 | A | * | 9/1997 | Horimai et al. | 369/44.23 |
| 6,529,454 | B1 | * | 3/2003 | Asoma et al. | 369/44.12 |
| 6,563,099 | B2 | * | 5/2003 | Kimura et al. | 250/201.5 |
| 7,639,588 | B2 | * | 12/2009 | Kimura et al. | 369/110.04 |
| 7,660,226 | B2 | * | 2/2010 | Ogata | 369/112.18 |
| 7,796,491 | B2 | * | 9/2010 | Asada et al. | 369/112.19 |
| 2005/0161579 | A1 | | 7/2005 | Kim et al. | |
| 2007/0036058 | A1 | * | 2/2007 | Okamoto et al. | 369/112.06 |
| 2007/0104072 | A1 | * | 5/2007 | Ogata | 369/112.16 |
| 2007/0223349 | A1 | * | 9/2007 | Shimada et al. | 369/112.16 |
| 2008/0239891 | A1 | * | 10/2008 | Ogata | 369/44.25 |
| 2008/0310283 | A1 | * | 12/2008 | De Wit et al. | 369/112.05 |

(Continued)

FOREIGN PATENT DOCUMENTS
EP    1 555 664 A2    7/2005
(Continued)

OTHER PUBLICATIONS
International Search Report for PCT/JP2007/056927, mailed May 15, 2007.

*Primary Examiner* — Hoa T Nguyen
*Assistant Examiner* — Mark Fischer
(74) *Attorney, Agent, or Firm* — Nixon & Vanderhye, P.C.

(57) ABSTRACT

An optical pickup for irradiating an information recording medium, such as a DVD, with a laser beam when an information signal is recorded or reproduced, and information equipment provided with the optical pickup. The optical pickup is capable of recording or reproducing an information signal with higher accuracy, while reducing an influence of stray light in an information recording medium, such as a multilayer type optical disc.

15 Claims, 16 Drawing Sheets

U.S. PATENT DOCUMENTS

2009/0129254 A1* 5/2009 Kouno ...................... 369/275.4

FOREIGN PATENT DOCUMENTS

| | | |
|---|---|---|
| JP | 10-124906 | 5/1998 |
| JP | 2001-216662 | 8/2001 |
| JP | 2005-44513 | 2/2005 |
| JP | 2005-063595 | 3/2005 |
| JP | 2005-203090 | 7/2005 |
| JP | 2005-216430 | 8/2005 |
| JP | 2005-228436 | 8/2005 |
| JP | 2005-339766 | 12/2005 |
| JP | 2005-346882 | 12/2005 |
| JP | 2006-344344 | 12/2006 |

* cited by examiner (a)

(b)

OPTICAL PICKUP AND INFORMATION DEVICE FOR REDUCING AN INFLUENCE OF STRAY LIGHT IN AN INFORMATION RECORDING MEDIUM

This application is the U.S. national phase of International Application No. PCT/JP2007/056927, filed 29 Mar. 2007, which designated the U.S. and claims priority to JP Application No. 2006-095904, filed 30 Mar. 2006, the entire contents of each of which are hereby incorporated by reference.

TECHNICAL FIELD

The present invention relates to an optical pickup for irradiating an information recording medium, such as a DVD, with a laser beam when an information signal is recorded or reproduced, and information equipment provided with the optical pickup.

BACKGROUND ART

For example, there has been developed an information recording medium, such as a multilayer type optical disc, for optically recording or reproducing an information signal (data) using a laser beam or the like. In such a multilayer type optical disc, if the interval between recording layers is large, a signal from the selected recording layer possibly deteriorates due to an influence of spherical aberration, so that the interval between recording layers tends to be narrowed. However, if the interval between recording layers is narrowed, because of so-called interlayer crosstalk, return light from the multilayer type optical disc includes not only a component of reflected light (hereinafter referred to as "signal light" as occasion demands) generated in a selected desired recording layer (hereinafter referred to as "one recording layer" as occasion demands) but also a component of reflected light (hereinafter referred to "stray light" as occasion demands) generated in another recording layer other than the one recording layer, at high level. Thus, a S/N ratio of the signal component of a reproduction signal or the like is possibly reduced, which possibly makes it hard to properly perform various controls, such as tracking control. Specifically, in general, it is known that the optical diameter of the signal light irradiated on a light receiving element (photo detector) (i.e. stability in an optical path within an optical pickup, and reliability in the control operation of the optical pickup) and the component of stray light have a relationship of tradeoff. Specifically, by increasing optical magnification and reducing an area of the light receiving element to be standardized, an influence of the stray light "Noise" to the signal level "Signal" is relatively reduced, by which the SN ratio (Signal to Noise Ratio) can be improved. However, the optical diameter of the signal light irradiated on the light receiving element is necessarily reduced, a position shift of the signal light is detected unnecessarily large, by the amount that the optical diameter of the signal light is reduced, if various signals, such as a tracking error signal, are generated in various divisional areas which constitute the light receiving element. Thus, it is necessary to adjust a mechanical, structural, and positional accuracy to be high in various actuators within the optical pickup, and to control the irradiation position of the signal light, highly accurately. That is, there is such a technical problem that the stability in the optical path within the optical pickup and the reliability in the control operation of the optical pickup are reduced.

Thus, for example, in a tracking method in the recording or reproduction of a dual-layer type Blu-ray disc, there has been suggested a technology for avoiding the stray light entering the light receiving element, by separating a push-pull signal from the signal light, using a hologram element. Alternatively, a patent document 1 discloses a technology of separating the reflected light from each recording layer highly accurately, using a difference in angle of the optical axis of the return light from each recording layer of the dual-layer type optical disc.

Patent document 1: Japanese Patent Application Laid Open NO. 2005-228436

DISCLOSURE OF INVENTION

Subject to be Solved by the Invention

However, with respect to the aforementioned, if the area of the light receiving element is increased, there is such a technical problem that the optical pickup is to be increased in size. Alternatively, in the various methods described above, there is such a technical problem that it is hard to properly reduce the influence of the stray light in response to an optical disc, such as a BD (Blu-ray Disc), having a smaller interlayer distance than the conventional one. Alternatively, in the various methods described above, the stray light enters the light receiving element for receiving a focus error signal (or RF signal) as shown in FIG. 16 (refer to overlap between "Stray light" and "Transmitted beam" in FIG. 16), so that there is such a technical problem that the S/N ratio of the signal component of the return light from the desired recording layer is reduced due to the influence of the stray light.

In view of the aforementioned problems, it is therefore an object of the present invention to provide an optical pickup capable of recording or reproducing an information signal with higher accuracy, while reducing an influence of stray light, in an information recording medium, such as a multilayer type optical disc, and information equipment provided with such an optical pickup.

Means for Solving the Subject (Optical Pickup)

The above object of the present invention can be achieved by an optical pickup for recording or reproducing an information signal with respect to an optical disc provided with a plurality of recording layers, each recording layer having a recording track in which information pits are arranged, the information signal is recorded in the information pits, the optical pickup provided with: a light source for irradiating a laser beam; a diffracting device (diffraction grating) for diffracting the irradiated laser beam; an optical system (half mirror, objective lens) for guiding the diffracted laser beam to one recording layer of the plurality of recording layers; an optical element (wavelength plate whose area is divided) for changing (i) a polarization direction in at least one portion of signal light generated in the one recording layer and (ii) a polarization direction in at least one portion of stray light generated in another recording layer of the plurality of recording layers, if the guided laser beam is focused on the one recording layer; and one or a plurality of light receiving devices (PD1a/PD1b/PD0) for receiving at least the signal light.

According to the optical pickup of the present invention, the laser beam irradiated from the light source, is diffracted by the diffracting device, such as a diffraction grating, to zero-order light and diffraction light (e.g. so-called −first-order diffraction light or minus first-order diffraction light in addition to or instead of +first-order diffraction light or plus first-order diffraction light), for example. Then, by the optical system, such as an objective lens, a beam splitter, or a prism, it is guided to and focused on the one recording layer of the plurality of recording layers. At the same time, the signal light generated in the one recording layer, is received by the light receiving device. Thus, the laser beam guided to and focused on the one recording layer, allows the information pits or marks formed in the one recording layer to be reproduced. Thus, it is possible to reproduce predetermined information from the optical disc. Alternatively, the focused laser beam allows the information pits or marks to be formed in the one recording layer. Thus, it is possible to record predetermined information onto the optical disc.

In particular, according to the present invention, (i) the polarization direction in the at least one portion of the signal light generated in the one recording layer or (ii) the polarization direction in the at least one portion of the stray light generated in the another recording layer is changed by the optical element. Specifically, the polarization direction in the at least one portion of the signal light, transmitted through the one portion of the optical element, is changed to the first direction, for example. At the same time, the polarization direction in the at least one portion of the stray light is also changed to the first direction, for example. On the other hand, the polarization direction in another portion of the signal light, transmitted through another portion of the optical element, is not changed, for example. At the same time, the polarization direction in another portion of the stray light, transmitted through another portion of the optical element, is not changed, for example. Moreover, the at least one portion of the signal light whose polarization direction is changed to the first direction, is received with the another portion of the stray light whose polarization direction is not changed on the light receiving device.

Therefore, it is possible to effectively reduce an influence of the light interference between (i) the at least one portion of the signal light and (ii) another portion of the stray light other than or except the at least one portion of the stray light, in which the polarization directions are different. In particular, the signal light of the ±first-order diffraction light or the like and the stray light of the zero-order light or the like have substantially the same level of light intensity. Thus, by making the polarization directions different, it is possible to reduce the influence of the light interference by the stray light, more significantly, on the light receiving device for receiving the signal light of the ±first-order diffraction light.

As a result, it is possible to effectively reduce the influence of the stray light in the tracking control based on e.g. the three-beam method on the multilayer type information recording medium, and it is possible to realize the highly-accurate tracking control by making the light receiving device receive the signal light, under the condition that the level of the light intensity (or the amplitude of the push-pull signal corresponding to the light intensity) is maintained to be higher.

In one aspect of the optical pickup of the present invention, one portion of the optical element sets the polarization direction in the one portion of signal light and the one portion of the stray light to a first direction ($\alpha+90$ degrees) (e.g. setting the phase of a delay axis of a wavelength plate to a first phase ($\beta+180$ degrees)), and another portion of the optical element sets the polarization direction in another portion of signal light and another portion of the stray light to a second direction ($\alpha$ degrees) (e.g. setting the phase of the delay axis of the wavelength plate to a second phase ($\beta$ degrees)) and the light receiving devices are relatively arranged so as to receive the one portion of the signal light with the another portion of the stray light.

According to this aspect, the polarization direction in the one portion of the signal light and the one portion of the stray light, transmitted through the one portion of the optical element, is changed to the first direction (e.g. $\alpha+90$ degrees) corresponding to a first phase difference (e.g. $\beta+180$ degrees) based on birefringence, for example. On the other hand, the polarization direction in the another portion of the signal light and the another portion of the stray light, transmitted through the another portion of the optical element, is changed to the second direction (e.g. $\alpha$ degrees) corresponding to a second phase difference (e.g. $\beta$ degrees) based on birefringence, for example. Then, the one portion of the signal light whose polarization direction is changed to the first direction, is received with the another portion of the stray light whose polarization direction is changed to the second direction, on the light receiving device.

Therefore, it is possible to effectively reduce the influence of the light interference between the one portion of the signal light and the another portion of the stray light, in which the polarization directions are different. In particular, the one portion of the signal light of the ±first-order diffraction light or plus/minus first-order diffraction light and the another portion of the stray light of the zero-order light have substantially the same level of light intensity. Thus, by making the polarization directions different, it is possible to reduce the influence of the light interference by the stray light of the zero-order light, more significantly, on the light receiving device for receiving the signal light of the ±first-order diffraction light, for example.

In another aspect of the optical pickup of the present invention, one portion of the optical element sets the polarization direction in the one portion of signal light and the one portion of the stray light to a first direction (e.g. $\alpha+90$ degrees), and another portion of the optical element sets the polarization direction in another portion of signal light and another portion of the stray light to a second direction (e.g. $\alpha$ degrees), and the light receiving devices are relatively arranged so as to receive the another portion of the signal light with the one portion of the stray light or so as to receive the one portion of the signal light with the another portion of the stray light.

According to this aspect, the polarization direction in the one portion of the signal light and the one portion of the stray light, transmitted through the one portion of the optical element, is changed to the first direction (e.g. $\alpha+90$ degrees) corresponding to the first phase difference (e.g. $\beta+180$ degrees) based on birefringence, for example. On the other hand, the polarization direction in the another portion of the signal light and the another portion of the stray light, transmitted through the another portion of the optical element, is changed to the second direction (e.g. $\alpha$ degrees) corresponding to the second phase difference (e.g. $\beta$ degrees) based on birefringence, for example. Then, the another portion of the signal light whose polarization direction is changed to the second direction, is received with the one portion of the stray light whose polarization direction is changed to the first direction, on the light receiving device.

Therefore, it is possible to effectively reduce the influence of the light interference between the another portion of the signal light and the one portion of the stray light, in which the polarization directions are different. In particular, the another portion of the signal light of the ±first-order diffraction light and the one portion of the stray light of the zero-order light have substantially the same level of light intensity. Thus, by making the polarization directions different, it is possible to reduce the influence of the light interference by the stray light of the zero-order light, more significantly, on the light receiving device for receiving the signal light of the ±first-order diffraction light.

In another aspect of the optical pickup of the present invention, the signal light is signal light of zero-order light or signal light of ±first-order diffraction light, and the stray light is stray light of zero-order light or stray light of ±first-order diffraction light.

According to this aspect, it is possible to effectively reduce the influence of the light interference between (i) the at least one portion of the signal light corresponding to the zero-order light and (ii) the another portion of the stray light other than or except the at least one portion of the stray light corresponding to the ±first-order diffraction light, in which the polarization directions are different. Alternatively, it is possible to effectively reduce the influence of the light interference between (i) the at least one portion of the signal light corresponding to the ±first-order diffraction light and (ii) the another portion of the stray light other than or except the at least one portion of the stray light corresponding to the zero-order light.

In an aspect associated with the optical element described above, the first direction and the second direction may be relatively different in polarization surfaces by 90 degrees.

By virtue of such construction, it is possible to effectively reduce the influence of the light interference between (i) the at least one portion of the signal light and (ii) the another portion of the stray light other than or except the at least one portion of the stray light, in which the polarization directions are relatively different by 90 degrees.

In another aspect of the optical pickup of the present invention, either one portion of the optical element or another portion of the optical element is a $\lambda/2$ wavelength plate.

According to this aspect, it is possible to effectively reduce the influence of the light interference between (i) the at least one portion of the signal light and (ii) the another portion of the stray light other than or except the at least one portion of the stray light, in which the polarization directions are relatively different by 90 degrees.

In another aspect of the optical pickup of the present invention, the optical element is disposed on optical path (i.e. homeward paths) which is not a parallel light flux and which guides return light generated in the plurality of recording layers to the light receiving devices.

According to this aspect, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In another aspect of the optical pickup of the present invention, the optical element is disposed in a position in which optical diameters of a plurality of stray lights, generated in a plurality of other layers, are all substantially equal, on an optical axis.

According to this aspect, using the light receiving device, it is possible to receive the at least one portion of the signal light with the another portion of the stray light, properly together, in which the polarization directions are different, through the optical element disposed in the position in which the optical diameters of the plurality of stray lights are all substantially equal. Here, the "optical diameter" of the present invention means a physical length, such as a diameter (or radius), which can be measured on the basis of the optical axis of the laser beam. In particular, the "optical diameter" may be uniquely determined on the basis of the optical features (e.g. optical magnification, diffraction angle, position of a main point, focal point length, etc.) in another optical system, such as a condenser lens.

Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than the at least one portion of the stray light, in which the polarization directions are different.

In another aspect of the optical pickup of the present invention, the optical element is disposed in a vicinity of a position on an irradiation side (Col_lens side), of a two focal lines of the signal light based on an astigmatic method.

According to this aspect, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, shapes of the one portion and the another portion of the optical element and a relative positional relationship between the one portion and the another portion of the optical element may be defined on the basis of (i-1) a optical diameter or optical magnification of the signal light corresponding to zero-order light on a plane perpendicular to an optical axis and (i-2) a optical diameter or optical magnification of the stray light, (ii-1) a optical diameter, a beam position, or optical magnification of the signal light corresponding to ±first-order light on the plane perpendicular to the optical axis, and (ii-2) a optical diameter, a beam position, or optical magnification of the stray light.

By virtue of such construction, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, shapes of the one portion and the another portion of the optical element and a relative positional relationship between the one portion and the another portion of the optical element may be defined on the basis of a width of an area in which an influence of the stray light is relatively large, in a optical diameter of the signal light.

By virtue of such construction, using the light receiving device, it is possible to receive the at least one portion of the signal light with the another portion of the stray light, properly together, in which the polarization directions are different, on the basis of the width of the area. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, shapes of the one portion and the another portion of the optical element and a relative positional relationship between the one portion and the another portion of the optical element may be defined on the basis of an interference pattern between the signal light and the stray light on the light receiving device.

By virtue of such construction, using the light receiving device, it is possible to receive the at least one portion of the signal light with the another portion of the stray light, properly together, in which the polarization directions are different, on the basis of the interference pattern. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, the optical pickup may be further provided with a cylindrical lens (multi lens) for performing an astigmatic method, and the optical element may be defined on the basis of the interference pattern on the light receiving device, which can be specified by (i) an angle between a diffraction direction of a +first-order light component of the signal light and a diffraction direction of a −first-order light component of the signal light and (ii) a cylinder direction of the cylindrical lens.

By virtue of such construction, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In another aspect of the optical pickup of the present invention, the optical pickup is further provided with a cylindrical lens (multi lens) for performing an astigmatic method, and the cylindrical lens is disposed such that (i) a cylinder direction of the cylindrical lens makes an angle of about 45 degrees with a plane formed by a diffraction direction of the signal light corresponding to a +first-order diffraction light and a diffraction direction of the signal light corresponding to a −first-order diffraction light, and (ii) an interference pattern is formed in an opposite direction to an offset direction of the +first-order diffraction light or an offset direction of the −first-order diffraction light, based on the signal light corresponding to zero-order light.

According to this aspect, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, the optical element may have at least two of the one portion of said optical element and at least two of the another portion of said optical element, which have a linear-symmetric positional relationship on the basis of a direction of a focal line corresponding to zero-order light (focal line on the condenser lens side).

By virtue of such construction, using the light receiving device, it is possible to receive the at least one portion of the signal light with the another portion of the stray light, properly together, in which the polarization directions are different, on the basis of the positional relationship of the focal line on the condenser lens side, for example. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, the optical element may have at least two of the one portion of said optical element and at least two of the another portion of said optical element, which have a linear-symmetric positional relationship on the basis of a direction for light-receiving a push-pull signal (Rad direction).

By virtue of such construction, using the light receiving device, it is possible to receive the at least one portion of the signal light with the another portion of the stray light, properly together, in which the polarization directions are different, on the basis of the positional relationship based on the direction for receiving the push-pull signal. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In an aspect associated with the optical element described above, the optical pickup may be further provided with a hologram element for at least changing a focal position of the signal light or a focal position of the stray light, and the hologram element may change the focal position such that (i) the one portion of the signal light and the another portion of the stray light or (ii) the another portion of the signal light and the one portion of the stray light are received together by the light receiving devices.

By virtue of such construction, using the light receiving device, it is possible to receive the at least one portion of the signal light with the another portion of the stray light, properly together, in which the polarization directions are different. Specifically, a most part or all of the signal light may be received, with it included in the another portion of the stray light, by the light receiving device. Therefore, it is possible to reduce the influence of the light interference, more effectively, between (i) the at least one portion of the signal light and (ii) the another portion of the stray light other than or except the at least one portion of the stray light, in which the polarization directions are different.

In another aspect of the optical pickup of the present invention, the optical element makes the polarization direction of the signal light corresponding to ±first-order diffraction light, be different from the polarization direction of the stray light corresponding to zero-order light, and the light receiving devices include at least a second light receiving device and a third light receiving device, of a first light receiving device (PD0) for receiving the zero-order light, the second light receiving device (PD1a) for receiving a +first-order diffraction light, and the third light receiving device (PD1b) for receiving a −first-order diffraction light.

According to this aspect, using the light receiving device including the second light receiving device and the third light receiving device, it is possible to receive the at least one portion of the signal light corresponding to the ±first-order diffraction light with the another portion of the stray light corresponding to the zero-order light, properly together, in which the polarization directions are different.

In another aspect of the optical pickup of the present invention, it is further provided with a controlling device (tracking control/focus control) for controlling the optical system to guide the laser beam to the recording track provided for the one recording layer, on the basis of the received signal light.

According to this aspect, for example, under the control of the controlling device for performing the tracking control or focus control, it is possible to effectively reduce the influence of the stray light on the multilayer type information recording medium, and it is possible to realize the highly accurate focus control and tracking control by making the light receiving device receive light under the condition that the level of the light intensity is maintained to be higher.

(Information Equipment)

The above object of the present invention can be also achieved by an information equipment provided with: the optical pickup of the present invention described above (including its various aspects); and a recording/reproducing device for irradiating the optical disc with the laser beam, to thereby perform the recording or reproduction of the information signal.

According to the information equipment of the present invention, it is possible to record the information signal onto the optical disc or to reproduce the information signal recorded on the optical disc, while receiving the same various benefits as those of the optical pickup of the present invention described above.

These effects and other advantages of the present invention will become more apparent from the embodiments explained below.

As explained above, according to the optical pickup of the present invention, it is provided with the light source, the diffracting device, the optical system, the optical element, and the light receiving device. As a result, it is possible to effectively reduce the influence of the stray light in the tracking control based on e.g. the three-beam method on the multilayer type information recording medium, and it is possible to realize the highly-accurate tracking control by making the light receiving device receive the signal light, under the condition that the level of the light intensity is maintained to be higher.

Alternatively, according to the information equipment of the present invention, it is provided with the light source, the diffracting device, the optical system, the optical element, the light receiving device, and the recording/reproducing device. As a result, it is possible to effectively reduce the influence of the stray light in the tracking control based on e.g. the three-beam method on the multilayer type information recording medium, and it is possible to realize the highly-accurate tracking control by making the light receiving device receive the signal light, under the condition that the level of the light intensity is maintained to be higher.

Figure 1:
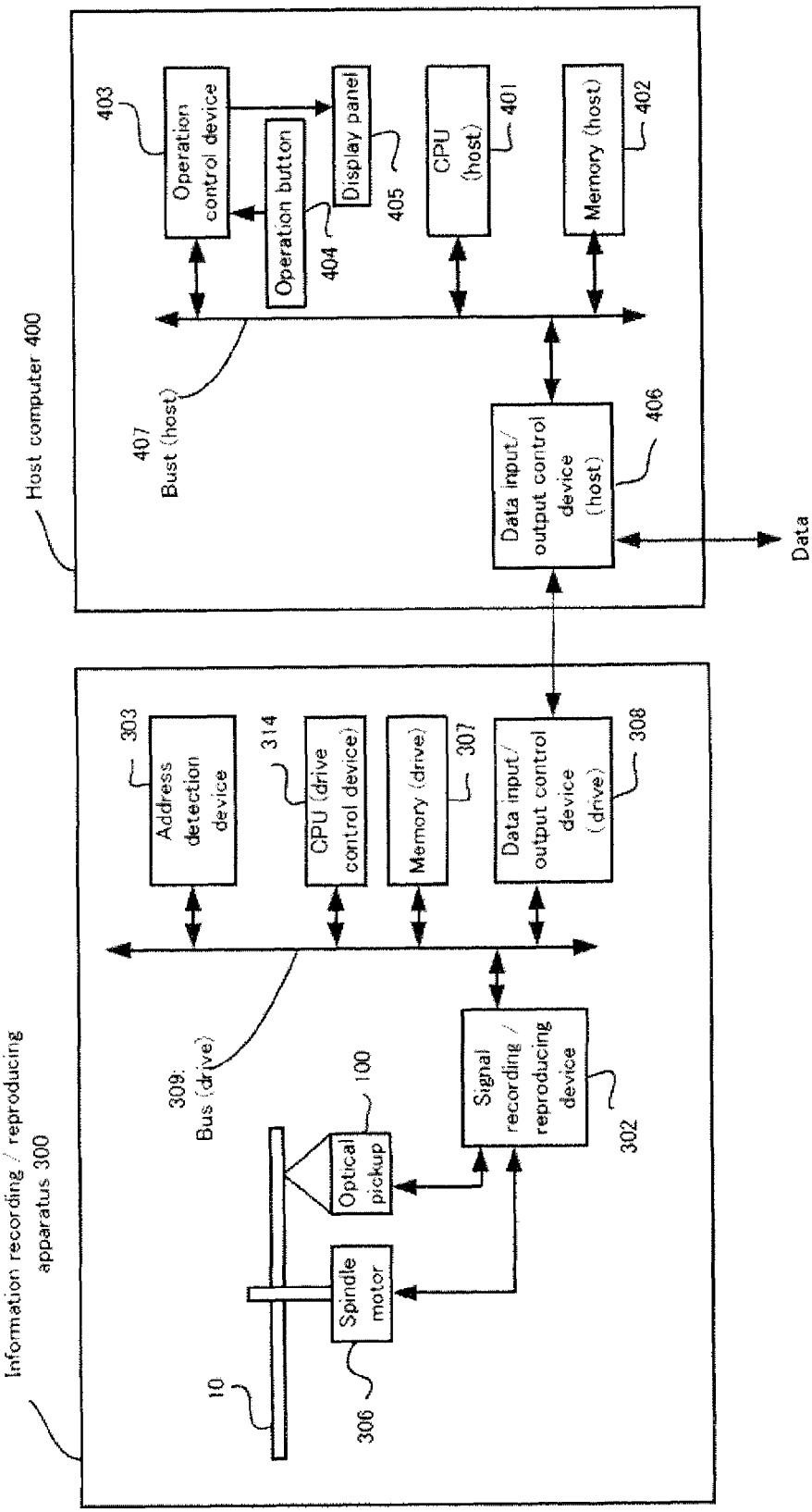
FIG. 1 is a block diagram showing the basic structure of an information recording/reproducing apparatus in an embodiment of the information recording apparatus of the present invention and a host computer.

DESCRIPTION OF REFERENCE CODES 10 optical disc
100 optical pickup
101 semiconductor laser
102 diffraction grating
103 etc. condenser lens
105 optical path branch element
106 reflection mirror
107 ¼ wavelength plate
110 cylindrical lens
111 etc. first wavelength plate
PD0 etc. light receiving device
300 information recording/reproducing apparatus
302 signal recording/reproducing device

BEST MODE FOR CARRYING OUT THE INVENTION

Hereinafter, the best mode for carrying out the invention will be explained in each embodiment in order, with reference to the drawings.

(1) Embodiment of Information Recording/Reproducing Apparatus

Firstly, with reference to FIG. 1, an explanation will be given on the basic structure of an information recording apparatus in an embodiment of the present invention in detail. Especially, the embodiment is a example of applying the an information recording apparatus of the present invention to an information recording/reproducing apparatus for an optical disc.

(1-1) Basic Structure

Firstly, with reference to FIG. 1, an explanation will be given on the basic structure of an information recording/reproducing apparatus 300 in an embodiment of the information recording apparatus of the present invention and a host computer 400. FIG. 1 is a block diagram showing the basic structure of the information recording/reproducing apparatus in the embodiment of the information recording apparatus of the present invention and the host computer. Incidentally, the information recording/reproducing apparatus 300 has a function of recording record data onto an optical disc 10 and a function of reproducing the record data recorded on the optical disc 10.

As shown in FIG. 1, the inner structure of the information recording/reproducing apparatus 300 will be explained. The information recording/reproducing apparatus 300 is an apparatus for recording information onto the optical disc 10 and for reading the information recorded on the optical disc 10, under the control of a CPU (Central Processing Unit) 314 for drive.

The information recording/reproducing apparatus 300 is provided with: the optical disc 10; an optical pickup 100; a signal recording/reproducing device 302; an address detection device 303; the CPU (drive control device) 314; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by housing the host computer 400 equipped with a communication device, such as a modem, in the same case. Alternatively, the information recording/reproducing apparatus 300 may be constructed to communicate with an external network by that the CPU (host control device) 401 of the host compute 400 equipped with a communication device, such as an i-link, controls the information recording/reproducing apparatus 300 directly through the data input/output control device 308 and the bus 309.

The optical pickup 100 is to perform the recording/reproducing with respect to the optical disc 10, and is provided with a semiconductor laser apparatus and a lens. More specifically, the optical pickup 100 irradiates the optical disc 10 with a light beam, such a laser beam, as reading light with a first power upon reproduction, and as writing light with a second power with it modulated upon recording.

The signal recording/reproducing device 302 performs the recording/reproducing with respect to the optical disc 10 by controlling the optical pickup 100 and the spindle motor 306. More specifically, the signal recording/reproducing device 302 is provided with a laser diode driver (LD driver), a head amplifier, and the like. The LD driver drives the not-illustrated semiconductor laser built in the optical pickup 100. The head amplifier amplifies the output signal of the optical pickup 100, i.e., the reflected light of the laser beam, and outputs the amplified signal. More specifically, the signal recording/reproducing device 302 drives the not-illustrated semiconductor laser built in the optical pickup 100 so as to determine an optimum laser power by the processes of recording and reproducing an OPC pattern, together with a not-illustrated timing generator or the like, under the control of the CPU 314, in an OPC (Optimum Power Control) process. In particular, the signal recording/reproducing device 302 constitutes one example of the "recording/reproducing device" of the present invention, with the optical pickup 100.

The address detector 303 detects an address (address information) on the optical disc 10 from a reproduction signal including e.g. a pre-format address signal or the like, outputted by the signal recording/reproducing device 302.

The CPU (drive control device) 314 controls the entire information recording/reproducing apparatus 300 by giving instructions to various devices, through the buss 309. Incidentally, software or firmware for operating the CPU 314 is stored in the memory 30. In particular, the CPU 314 constitutes one example of the "controlling device" of the present invention.

The spindle motor 306 is to rotate and stop the optical disc 10, and operates in accessing the optical disc 10. More specifically, the spindle motor 306 is constructed to rotate the optical disc 10 at a predetermined speed and stop it, under the spindle servo provided by a not-illustrated servo unit or the like.

The memory 307 is used in the general data processing and the OPC process on information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area in which a program for performing an operation as a recording device, i.e., firmware, is stored; a buffer for temporarily storing the record/reproduction data; a RAM area in which a parameter required for the operation of the firmware program or the like is stored; and the like.

The data input/output control device 308 controls the data input/output from the exterior with respect to the information recording/reproducing apparatus 300, and stores the data into or extracts it from a data buffer on the memory 307. A drive control command, which is issued from the external host computer 400 connected to the information recording/reproducing apparatus 300 via an interface, such as a SCSI (Small Computer System Interface) and an ATAPI (AT Attachment Packet Interface), is transmitted to the CPU 314 through the data input/output control device 308. Moreover, the record/reproduction data is also exchanged with the host computer 400 through the data input/output control device 308.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of the operation instruction and display with respect to the host computer 400. The operation control device 403 sends the instruction to perform the recording or reproduction, using the operation bottom 401, to the CPU 401. The CPU 401 may send a control command to the information recording/reproducing apparatus 300 through the input/output control device 406 on the basis of the instruction information from the operation/display control device 403, to thereby control the entire information recording/reproducing apparatus 300. In the same manner, the CPU 401 can send a command of requiring the information recording/reproducing apparatus 300 to send the operational state to the host, to the information recording/reproducing apparatus 300. By this, it is possible to recognize the operational state of the information recording/reproducing apparatus 300, such as during recording and during reproduction. Thus, the CPU 401 can output the operational state of the information recording/reproducing apparatus 300, to the display panel 405, such as a fluorescent tube and a LCD, through the operation control device 403.

One specific example in which the information recording/reproducing apparatus 300 and the host computer 400, as explained above, are used together is household equipment, such as recorder equipment for recording/reproducing a video. The recorder equipment is equipment for recording a video signal from a broadcast reception tuner and an external connection terminal, onto a disc, and for outputting the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the disc drive are connected to each other through the data input/output control devices 308 and 406, such as the SCSI and the ATAPI. An application, such as writing software, which is installed in the host computer, controls the disc drive.

(2) Optical Pickup (2-1) Basic Structure of Optical Pickup

Figure 2:
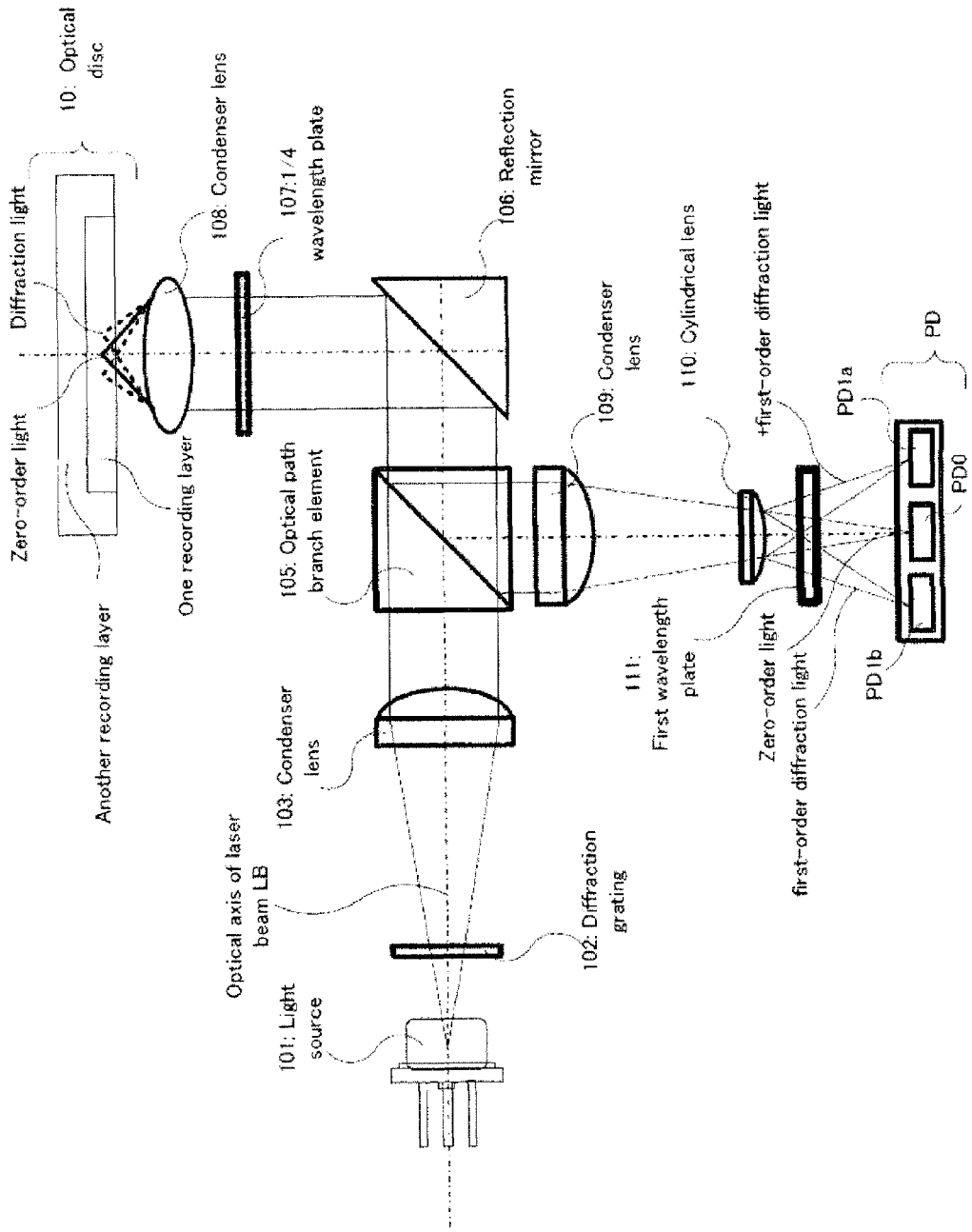
FIG. 2 is a block diagram conceptually showing the more detailed structure of an optical pickup 100 provided for an information recording/reproducing apparatus 300 in the embodiment.

Next, with reference to FIG. 2, a more detailed explanation will be given on the optical pickup 100 provided for the information recording/reproducing apparatus 300 in the embodiment. FIG. 2 is a block diagram conceptually showing the more detailed structure of the optical pickup 100 provided for the information recording/reproducing apparatus 300 in the embodiment.

As shown in FIG. 2, the optical pickup 100 is provided with: a semiconductor laser 101 (i.e. one specific example of the light source of the present invention); a diffraction grating 102 (i.e. one specific example of the diffracting device of the present invention); a condenser lens (e.g. collimator lens) 103; an optical path branch element (e.g. half mirror) 105; a reflection mirror 106; a ¼ wavelength plate 107; a condenser lens 108; a condenser lens 109; a cylindrical lens 110; a first wavelength plate 111; a light receiving device (or photo detector) PD0; a light receiving device (or photo detector) PD1a; and a light receiving device (or photo detector) PD1b. Therefore, a laser beam LB is emitted from the semiconductor laser 101 in the following order and is received by the light receiving device PD0 or the like through each element. That is, if it is guided to one recording layer of the optical disc as a so-called outward on the optical path, the laser beam LB emitted from the semiconductor laser 101 is guided to the one recording layer through the diffraction grating 102, the condenser lens 103, the optical path branch element 105, the reflection mirror 106, the ¼ wavelength plate 107, and the condenser lens 108. On the other hand, as a so-called homeward on the optical path, the laser beam LB reflected by the one recording layer, is received on the light receiving device PD0 through the condenser lens 108, the ¼ wavelength plate 107, the reflection mirror 106, the optical path branch element 105, the condenser lens 109, and the cylindrical lens 110.

Incidentally, the condenser lenses 103, 108, and 109, the optical path branch element 105, the reflection mirror 106, the ¼ wavelength plate 107, and the cylindrical lens 110 constitute one specific example of the optical system of the present invention. Moreover, the light receiving devices PD0, PD1a, and PD1b constitute one specific example of the light receiving device of the present invention.

The semiconductor laser 101 emits the laser beam LB in an elliptical light emission pattern which enlarges more in a perpendicular direction than in a horizontal direction, for example.

The diffraction grating 102 diffracts the laser beam emitted from the semiconductor laser 101, to zero-order light (so-called main beam), +first-order light or plus first-order light, and −first-order light or minus first-order light (so-called sub beam).

The condenser lens 103 makes the incident laser beam LB substantially parallel and makes it enter the optical path branch element 105.

The optical path branch element 105 is an optical element for branching the optical path on the basis of a polarization direction, such as a polarized beam splitter (i.e. PBS). Specifically, the optical path branch element 105 (i) transmits the laser beam LB whose polarization direction is one direction, therethrough in such a condition that there is little or no loss of the quantity of light, and (ii) reflects the laser beam LB which enters from the optical disc side and whose polarization direction is another direction (i.e. the reflected light from the optical disc 10 in the laser beam LB) in such a condition that there is little or no loss of the quantity of light. The reflected light reflected on the optical path branch element 105, is received by the light receiving devices PD0, PD1a, and PD1b, through the condenser lens 109 and the cylindrical lens 110.

The reflection mirror reflects the laser beam LB in such a condition that there is little or no loss of the quantity of light.

The ¼ wavelength plate 107 provides the laser beam with a phase difference of 90 degrees, to thereby convert the linearly-polarized laser beam to circularly-polarized light and convert the circularly-polarized laser to the linearly-polarized laser.

The condenser lens 108 focuses the incident laser beam LB and irradiates it on the recording surface of the optical disc 10. Specifically, the condenser lens 108 is provided, for example, with an actuator device, and has a driving mechanism for changing the arrangement position of the condenser lens 108. More specifically, the actuator device displaces the position of the condenser lens 108 e.g. objective lens in a focus direction, to thereby focus a focal point on one recording layer (e.g. L0 layer) and another recording layer (e.g. L1 layer) of the optical disc.

The condenser lens 109 focuses the reflected light reflected on the optical path branch element 105.

The cylindrical lens 110 generates astigmatism on the light receiving device PD, for focus control based on an astigmatic method.

The light receiving device PD is provided with the light receiving devices PD0, PD1a, and PD1b. The light receiving device PD0 receives the zero-order light. The light receiving device PD1a receives the +first-order light. The light receiving device PD1b receives the −first-order light.

(2-1) Light Interference of Signal Light and Stray Light

Figure 3:
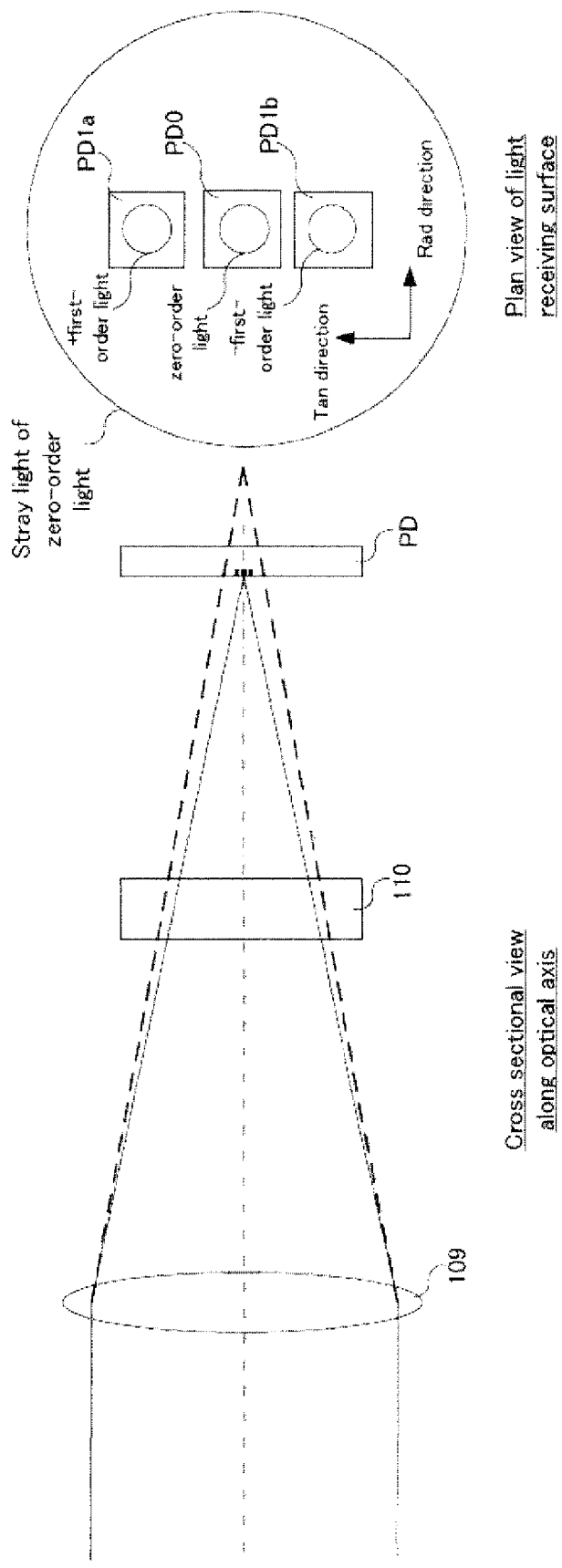
FIG. 3 is one schematic diagram conceptually showing light interference of signal light and stray light within a general optical pickup.
Figure 4:
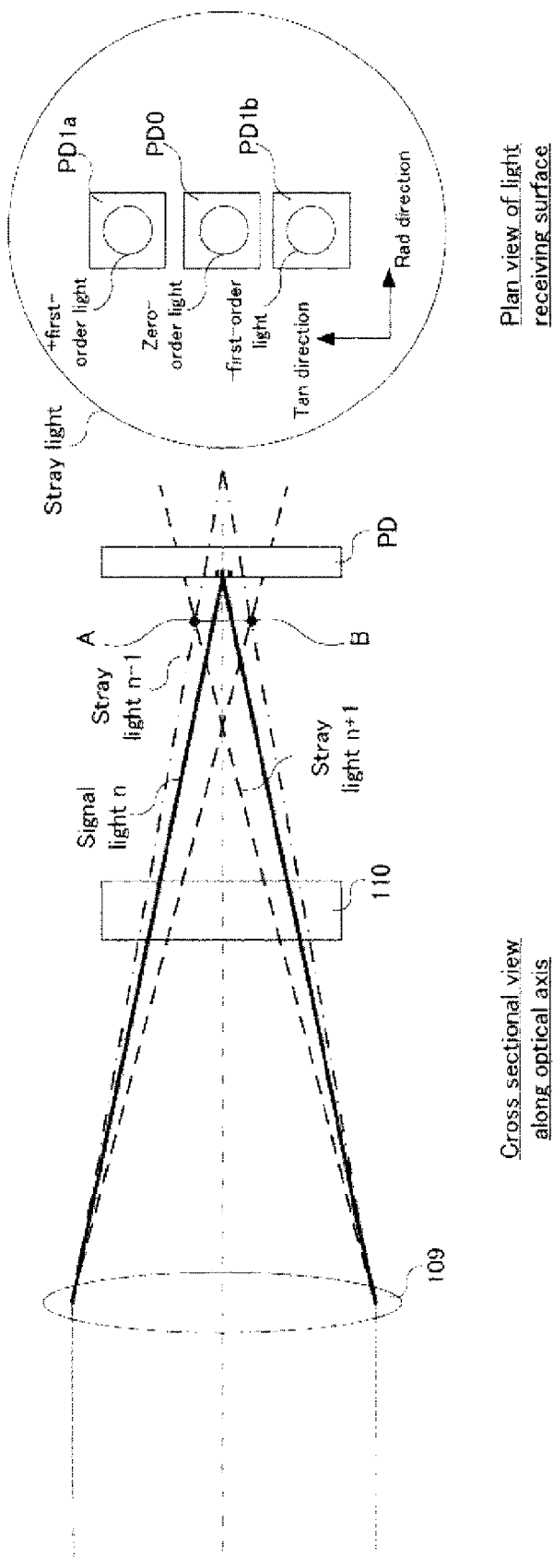
FIG. 4 is another schematic diagram conceptually showing the light interference of the signal light and the stray light within the general optical pickup.
Figure 5:
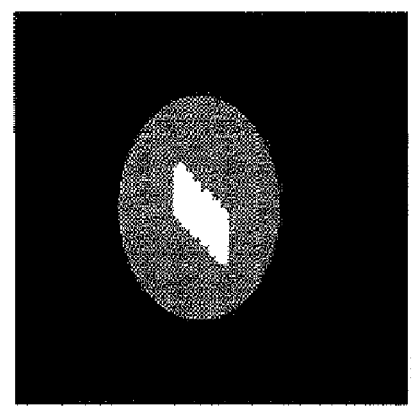
FIG. 5 are a plan view (FIG. 5(a)) showing, by dark and light colors, the light intensity if the light interference does not occur in a optical diameter of light received on a light receiving device within the general optical pickup, and a plan view (FIG. 5(b)) showing, by dark and light colors, the light intensity, if the light interference occurs in the optical diameter of the light received on the light receiving device within the general optical pickup.
Figure 5:
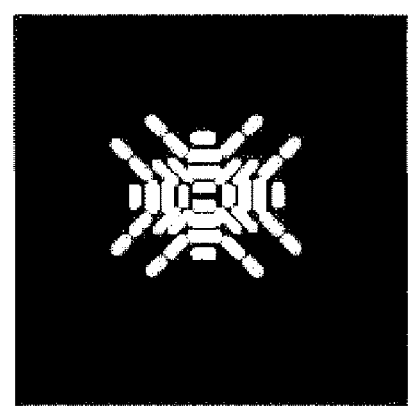

Next, with reference to FIG. 3 to FIG. 5, an explanation will be given on light interference of signal light and stray light within a general optical pickup. FIG. 3 is one schematic diagram conceptually showing the light interference of the signal light and the stray light within the general optical pickup. FIG. 4 is another schematic diagram conceptually showing the light interference of the signal light and the stray light within the general optical pickup. FIG. 5 are a plan view (FIG. 5(a)) showing, by dark and light colors, the light intensity if the light interference does not occur in a optical diameter of light received on a light receiving device within the general optical pickup, and a plan view (FIG. 5(b)) showing, by dark and light colors, the light intensity, if the light interference occurs in the optical diameter of the light received on the light receiving device within the general optical pickup. Incidentally, in FIG. 5, the light intensity at a relatively high level is lighter (or white), and the light intensity at a relatively low level is darker (or black).

As shown in FIG. 3, if a recording or reproduction process is performed on the recording layer on the rear side (i.e. another recording layer in FIG. 2 described above), zero-order stray light is irradiated with it defocused (e.g. dully) in an area including the light receiving device PD0 for receiving the zero-order light, the light receiving device PD1a for receiving the +first-order light, and the light receiving device PD1b for receiving the −first-order light. In particular, the focal point position of the zero-order stray light is on the rear side of the light receiving device PD, viewed from the irradiation side of the laser beam, on an optical axis.

On the other hand, as shown in FIG. 4, if the recording or reproduction process is performed on the recording layer on the front side (i.e. one recording layer in FIG. 2 described above), the zero-order stray light is irradiated with it defocused (e.g. dully) in an area including the light receiving device PD0 for receiving the zero-order light, the light receiving device PD1a for receiving the +first-order light, and the light receiving device PD1b for receiving the −first-order light. In particular, the focal point position of the zero-order stray light is on the front side of the light receiving device PD, viewed from the irradiation side of the laser beam, on an optical axis.

Thus, with regard to the distribution of the light intensity of the laser beam received on the light receiving surface of the light receiving device shown in FIG. 5, if there is the light interference by the stray light, compared to the case where there is no light interference by the stray light (refer to a light (or white) portion in FIG. 5(a)), the level of the light intensity finely changes in a light flux (refer to a white/black stripe portion in FIG. 5(b)). The main purpose of the present invention is to reduce an influence of the stray light and to maintain the quality of the signal light at a high level.

(3) First Wavelength Plate

Next, with reference to FIG. 6 to FIG. 11, an explanation will be given on the basic structure, location, and optical principle of a first wavelength plate (i.e. one specific example of the "optical element" of the present invention) provided for the optical pickup in the embodiment.

(3-1) Basic Structure of First Wavelength Plate

Figure 6:
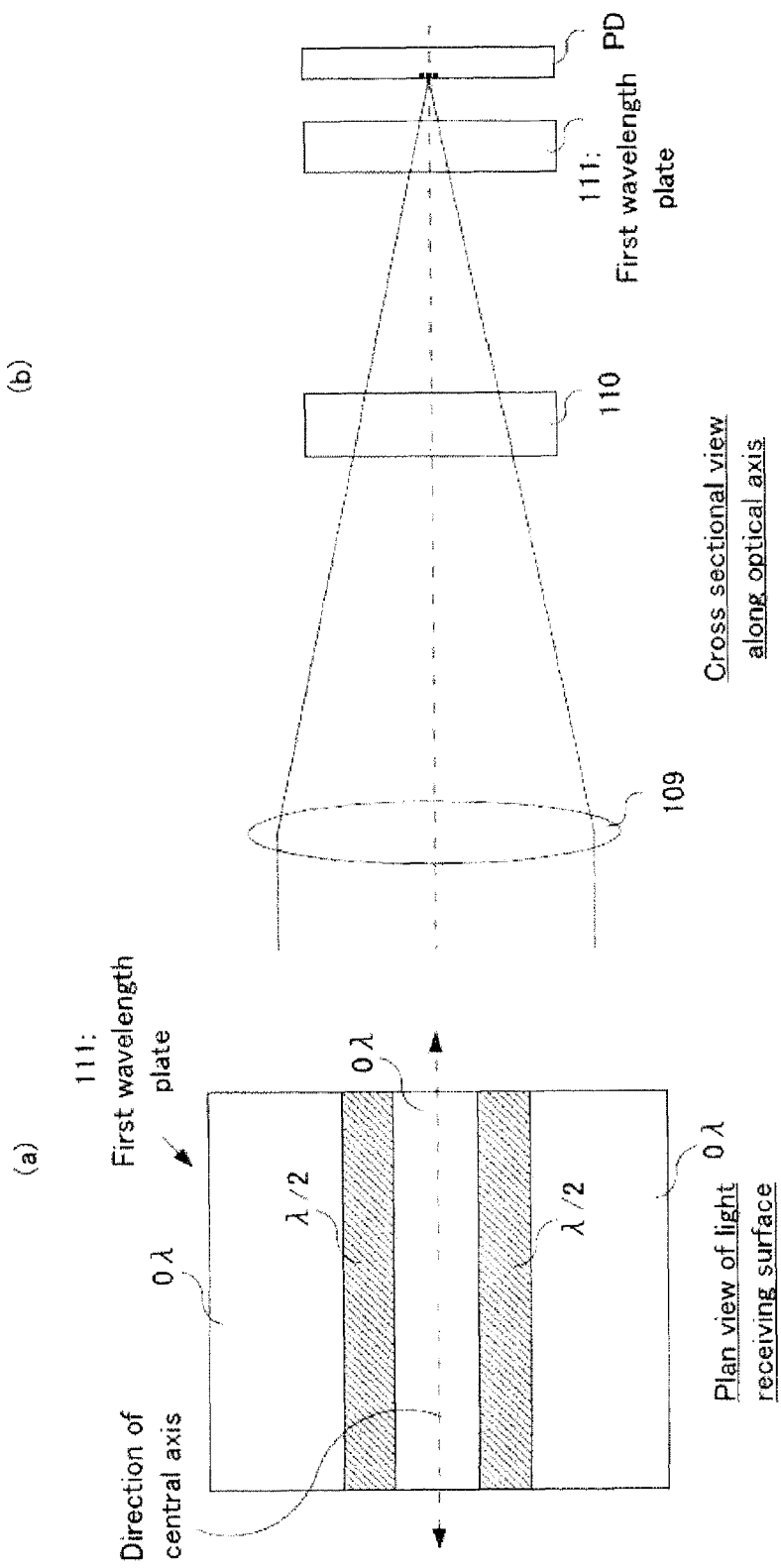
FIG. 6 are a plan view (FIG. 6(a)) schematically showing a light receiving surface of a first wavelength plate provided for the optical pickup in the embodiment, and a cross sectional view (FIG. 6(b)) schematically showing the location of the first wavelength plate.

Firstly, with reference to FIG. 6 and FIG. 7, an explanation will be given on the basic structure of the first wavelength plate provided for the optical pickup in the embodiment. FIG. 6 are a plan view (FIG. 6(a)) schematically showing a light receiving surface of the first wavelength plate provided for the optical pickup in the embodiment, and a cross sectional view (FIG. 6(b)) schematically showing the location of the first wavelength plate.

As shown in FIG. 6(a), a first wavelength plate 111 provided for the optical pickup in the embodiment, is provided with: (i) two areas in which the polarization direction of the transmitted laser beam is changed (refer to areas "λ/2" in FIG. 6(a)); and (ii) three areas in which the polarization direction of the transmitted laser beam is not changed (refer to areas "0λ" in FIG. 6(a)). The areas "λ/2" allow a predetermined amount of phase difference (i.e. a phase difference of 180 degrees) to be generated, in the phase of a normal light beam and in the phase of an abnormal light beam, on the basis of birefringence. Thus, the laser light transmitted through the areas "λ/2", can be changed in the polarization direction by 90 degrees, compared to the laser beam that is not transmitted through the areas "λ/2".

In addition, the two areas "λ/2" are arranged in a line-symmetric manner, on the basis of a central axis of the first wavelength plate 111. Specifically, the positional relationship of the two areas "λ/2" may be defined on the basis of the width of a dead band, Here, the width of the dead band in the embodiment means a predetermined width (i) which allows the influence of the light interference of the signal light and the stray light to be reduced by blocking (or masking) the light transmission on the basis of the diameter of the signal light irradiated on the light receiving device and (ii) which allows a predetermined level of light intensity (or amplitude of a push-pull signal corresponding to the predetermined level of light intensity) to be obtained. Incidentally, the "dead band" constitutes one specific example of the "area in which the influence of the stray light is relatively large" in the present invention.

(3-1-1) Study by Inventor of Present Invention

Figure 7:
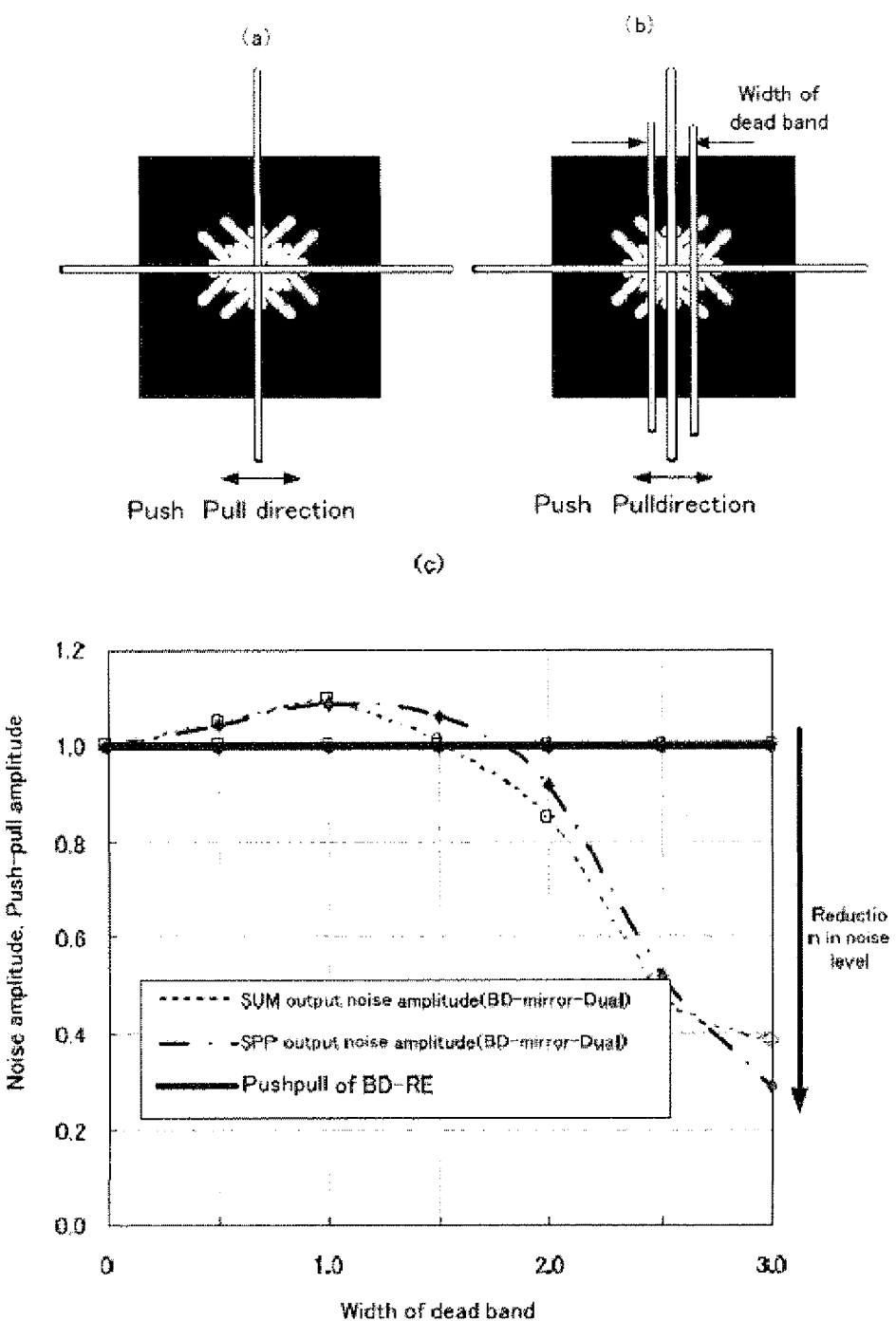
FIG. 7 are a plan view (FIG. 7(a)) showing, by dark and light colors, the light intensity if the light interference occurs in the optical diameter of the light received on the light receiving device within the optical pickup in the embodiment, a plan view (FIG. 7(b)) showing a relationship between the optical diameter of the light received on the light receiving device within the optical pickup in the embodiment and the width of a dead band, and a table (FIG. 7(c)) showing a relationship between the width of the dead band and a noise level in the embodiment.

Specifically, as shown in FIG. 7, in the study by the inventor of the present invention, the influence of the stray light is quantitatively measured in substantially the central portion of an interference pattern. FIG. 7 are a plan view (FIG. 7(a)) showing, by dark and light colors, the light intensity if the light interference occurs in the optical diameter of the light received on the light receiving device within the optical pickup in the embodiment, a plan view (FIG. 7(b)) showing a relationship between the optical diameter of the light received on the light receiving device within the optical pickup in the embodiment and the width of the dead band, and a table (FIG. 7(c)) showing a relationship between the width of the dead band and a noise level in the embodiment.

That is, the width of the dead band is set as shown in FIG. 7(b), with respect to the optical diameter of the light irradiated on the light receiving device shown in FIG. 7(a). Thus, as shown in FIG. 7(c), it is possible to obtain the graph indicating a change in the level of noise and the level of the light intensity (i.e. the level of the push-pull signal), with the width of the dead band as a parameter (refer to a horizontal axis). Incidentally, in FIG. 7(c), for example, a thick solid line indicates the level of the amplitude of the push-pull signal of a blue LD (i.e. Laser Diode), a dotted line indicates the level of the amplitude of a SUM (i.e. Summary) output noise, and an alternate long and short dash line indicates the level of the amplitude of a SPP (i.e. Signal Pre Pit) output noise. That is, as shown in FIG. 7(c), it is shown that the noise level rapidly reduces as the width of the dead band increases from "2.0". Moreover, it is also shown that the noise level can be reduced by about 70% in a width of the dead band of "3.0".

As a result, it is found that the minimum value of the area (i.e. the width of the "central portion of the optical diameter of the signal light" in FIG. 11 described later) in which the polarization directions cross at right angles or are different by ninety degrees in order to reduce the influence of the stray light, is determined on the basis of the width of the dead band.

(3-2) Location of First Wavelength Plate

Figure 8:
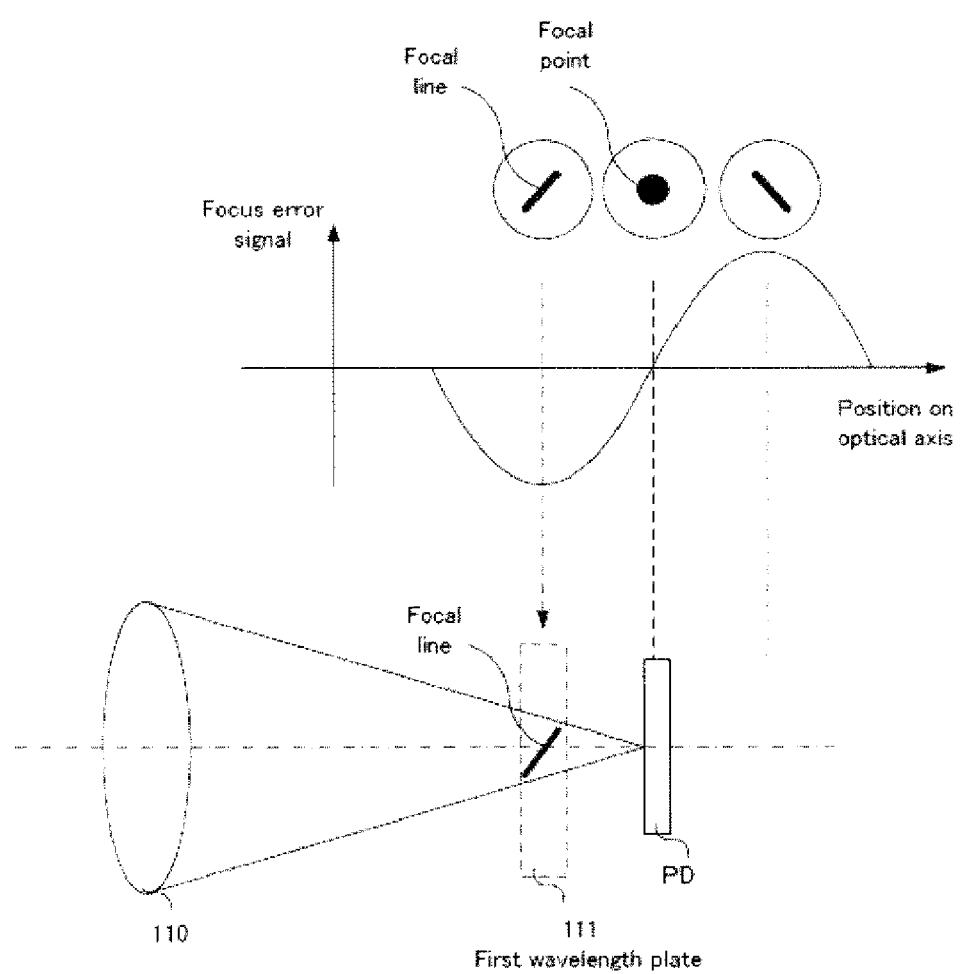
FIG. 8 is a cross sectional view schematically showing the position of a focal line on an optical axis on which the first wavelength plate is disposed, in the embodiment.

Next, an explanation will be given on the location of the first wavelength plate in the embodiment, with reference to FIG. 8 as well as FIG. 6 described above, as occasion demands. FIG. 8 is a cross sectional view schematically showing the position of a focal line on an optical axis on which the first wavelength plate is disposed, in the embodiment.

As shown in FIG.6(b), the first wavelenth plate 111 provided for the optical pickup in the embodiment, is disposed between the cylindrical lens 110 and the light receiving device PD. Specifically, as shown in FIG.8, the first wavelength plate 111 may be disposed in a position of the focal line on the cylindrical lens 110 side on the optical axis. Alternatively, the first wavelength plate 111 may be disposed where all the optical diameters of a plurality of stray lights, which are generated in a plurality of other recording layers, are substantially equal, on the optical axis, as shown in FIG.4 describes above. Specifically, as shown in FIG.4, if a focal point is on the "n"th recording layer, the first wavelength plate 111 may be disposed where all the optical diameters of a plurality of stray lights are substantially equal (refer to the distance between an "A point" and a "B point" in FIG.4).These all optical diameters of a plurality of stray lights are generated in other recording layers and which includes stray light "n−1" generated in the "n−1"th recording layer and stray light "n+1" generated in the "n+1"th recording layer.

Figure 9:
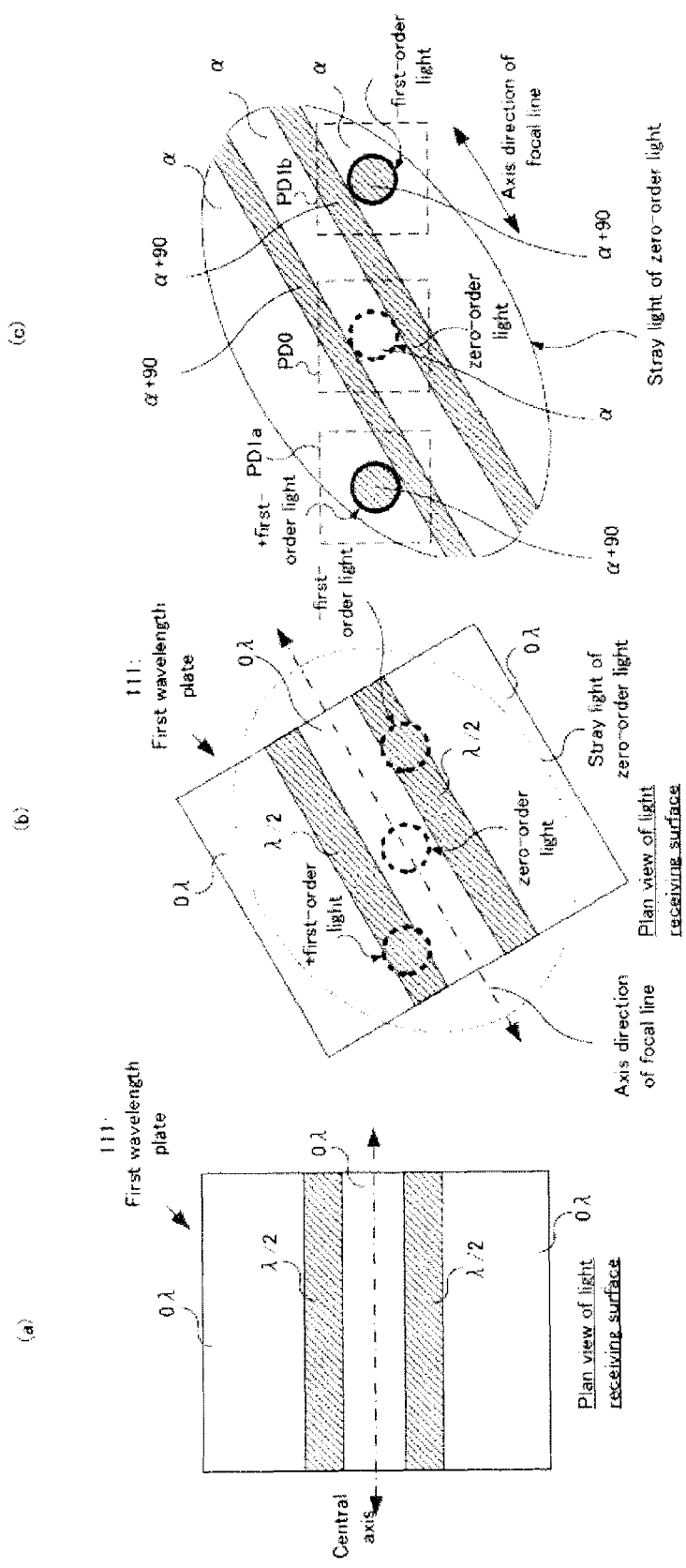
FIG. 9 are a plan view (FIG. 9(a)) schematically showing the light receiving surface of the first wavelength plate in the embodiment, a plan view (FIG. 9(b)) schematically showing a relative positional relationship between the optical diameter in which zero-order light is irradiated and the optical diameter in which ±first-order light is irradiated, on the light receiving surface of the first wavelength plate, and a plan view (FIG. 9(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.

(3-3) Optical Principle in which Polarization Directions are Different in Signal Light and Stray Light Next, with reference to FIG. 9 to FIG. 11, an explanation will be given on the optical principle in which the polarization directions are different in the signal light and the stray light received on the light receiving device in the embodiment. FIG. 9 are a plan view (FIG. 9(a)) schematically showing the light receiving surface of the first wavelength plate in the embodiment, a plan view (FIG. 9(b)) schematically showing a relative positional relationship between the optical diameter in which zero-order light is irradiated and the optical diameter in which ±first-order light i.e. ±1 order light is irradiated, on the light receiving surface of the first wavelength plate, and a plan view (FIG. 9(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.

As shown in FIG. 9(a) and FIG. 9(b), the central axis of the first wavelength plate 111 may be substantially matched with the axial direction of the focal line described above. Alternatively, the central axis of the first wavelength plate 111 may be set to make a predetermined angle (e.g. 45 degrees) with the cylinder direction of the cylindrical lens described above. At this time, as shown in FIG. 9(b), the area "λ/2" is disposed on the light receiving surface of the first wavelength plate 111, such that the optical diameter in which the signal light corresponding to the +first-order light is irradiated, is positioned on the area "λ/2" described above. Thus, the polarization direction of the signal light corresponding to the +first-order light is changed by 90 degrees. Moreover, the optical diameter in which the signal light corresponding to the −first-order light or minus first order light is irradiated, is also positioned on the area "λ/2" described above. Thus, the polarization direction of the signal light corresponding to the −first-order light is also changed by 90 degrees. Moreover, the optical diameter (i.e. light spot) in which the signal light corresponding to the zero-order light is irradiated, is positioned on the area "0λ" described above. Thus, the polarization direction of the signal light corresponding to the zero-order light is not changed. In addition, as in the signal light corresponding to the zero-order light, the optical diameter in which the stray light is irradiated, has a relatively large elliptical shape including the three areas described above. This stray light is corresponding to the zero-order light whose polarization direction is not changed. And the stray light is irradiated with it defocused (dully) on the first wavelength plate 111.

Therefore, as shown in FIG. 9(*c*), on the light receiving device PD1*a*, the signal light of the +first-order light whose polarization direction is changed by 90 degrees (refer to "α+90 degrees" and the inside of a shaded circle in FIG. 9(*c*)) is received with the stray light of the zero-order light whose polarization direction is not changed (refer to "αdegrees" in FIG. 9(*c*)). Substantially in the same manner, on the light receiving device PD1*b*, the signal light of the −first-order light whose polarization direction is changed by 90 degrees (refer to "α+90 degrees" and the inside of the shaded circle in FIG. 9(*c*)) is received with the stray light of the zero-order light whose polarization direction is not changed (refer to "α degrees" in FIG. 9(*c*)). Incidentally, the two shaded long and thin rectangular areas positioned diagonally in FIG. 9(*c*) indicate portions in which the polarization direction is changed by 90 degrees in the stray light of the zero-order light.

As a result, it is possible to effectively reduce the influence of the light interference between (i) the signal light of the +first-order light (or −first-order light) and (ii) the stray light of the zero-order light. In particular, the signal lights of the ±first-order light and the stray light of the zero-order light are substantially equal in the level of the light intensity. Thus, by making the polarization directions different, it is possible to more significantly reduce the influence of the light interference by the stray light, on the light receiving devices PD1*a* and PD1*b* on which the signal lights of the ±first-order light or the like are received.

As a result, it is possible to effectively reduce the influence of the stray light in the tracking control based on e.g. the three-beam method on the multilayer type information recording medium, and it is possible to realize the highly-accurate tracking control by making the light receiving device PD receive the signal light, under the condition that the level of the light intensity (or the amplitude of the push-pull signal corresponding to the light intensity) is maintained to be higher.

Now, with reference to FIG. 10 and FIG. 11, a more detailed explanation will be given on the relative positional relationship between (i) the optical diameter in which the zero-order light is irradiated and (ii) the optical diameter in which the ±first-order light is irradiated, on the light receiving surface of the first wavelength plate or the light receiving device, if a focal point is on the recording layer on the front side or on the rear side. FIG. 10 are plan views (FIG. 10(*a*) to FIG. 10(*d*)) schematically showing the relative positional relationship between (i) the optical diameter in which the zero-order light is irradiated and (ii) the optical diameter in which the +first-order light is irradiated, on the light receiving surface of the first wavelength plate or the light receiving device, if the focal point is on the recording layer on the front side or on the rear side, in the embodiment. FIG. 11 is a plan view schematically showing the relative positional relationship between (i) the optical diameter in which zero-order light is irradiated and (ii) the optical diameter in which ±first-order light is irradiated, on the light receiving surface of the light receiving device, if a focal point is on the recording layer on the front side, in the embodiment.

Figure 10:
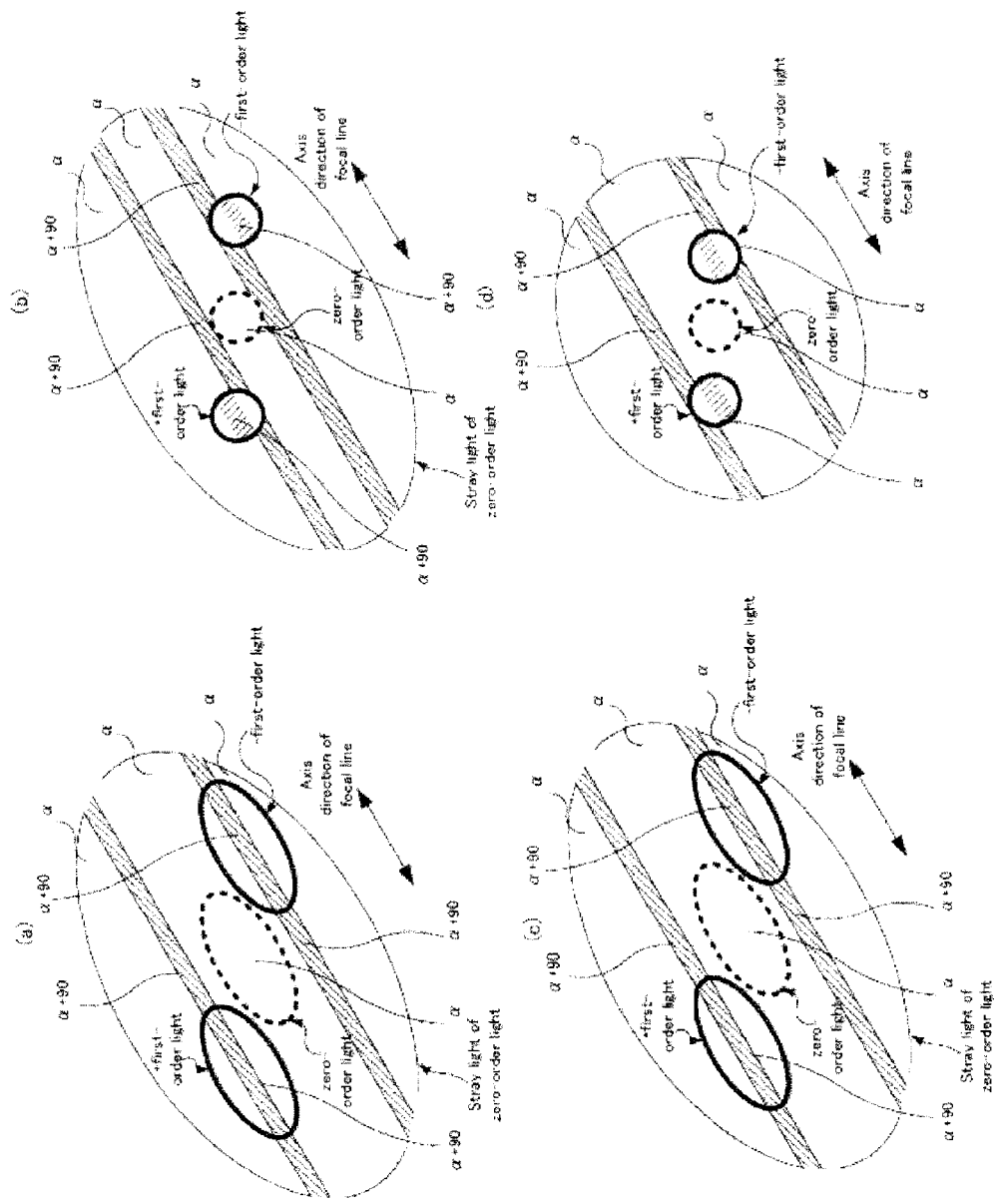
FIG. 10 are plan views (FIG. 10(a) to FIG. 10(d)) schematically showing the relative positional relationship between the optical diameter in which zero-order light is irradiated and the optical diameter in which ±first-order light is irradiated, on the light receiving surface of the first wavelength plate or the light receiving device, if a focal point is on the recording layer on the front side or on the rear side, in the embodiment.

As shown in FIG. 10(*a*), if the focal point is on the recording layer on the front side, it is possible to change the shape of the optical diameter (i.e. light spot) of the ±first-order light or the shape of the optical diameter of the zero-order light, which are irradiated on the light receiving surface of the first wavelength plate 111, by setting the angle between the central axis of the first wavelength plate 111 and the axial direction of the focal line, to a predetermined value. Therefore, as shown in FIG. 10(*b*), it is possible to change the shape and position of the optical diameter (i.e. light spot) of the ±first-order light or the shape and position of the optical diameter of the zero-order light, which are irradiated on the light receiving surface of the light receiving device PD.

Figure 11:
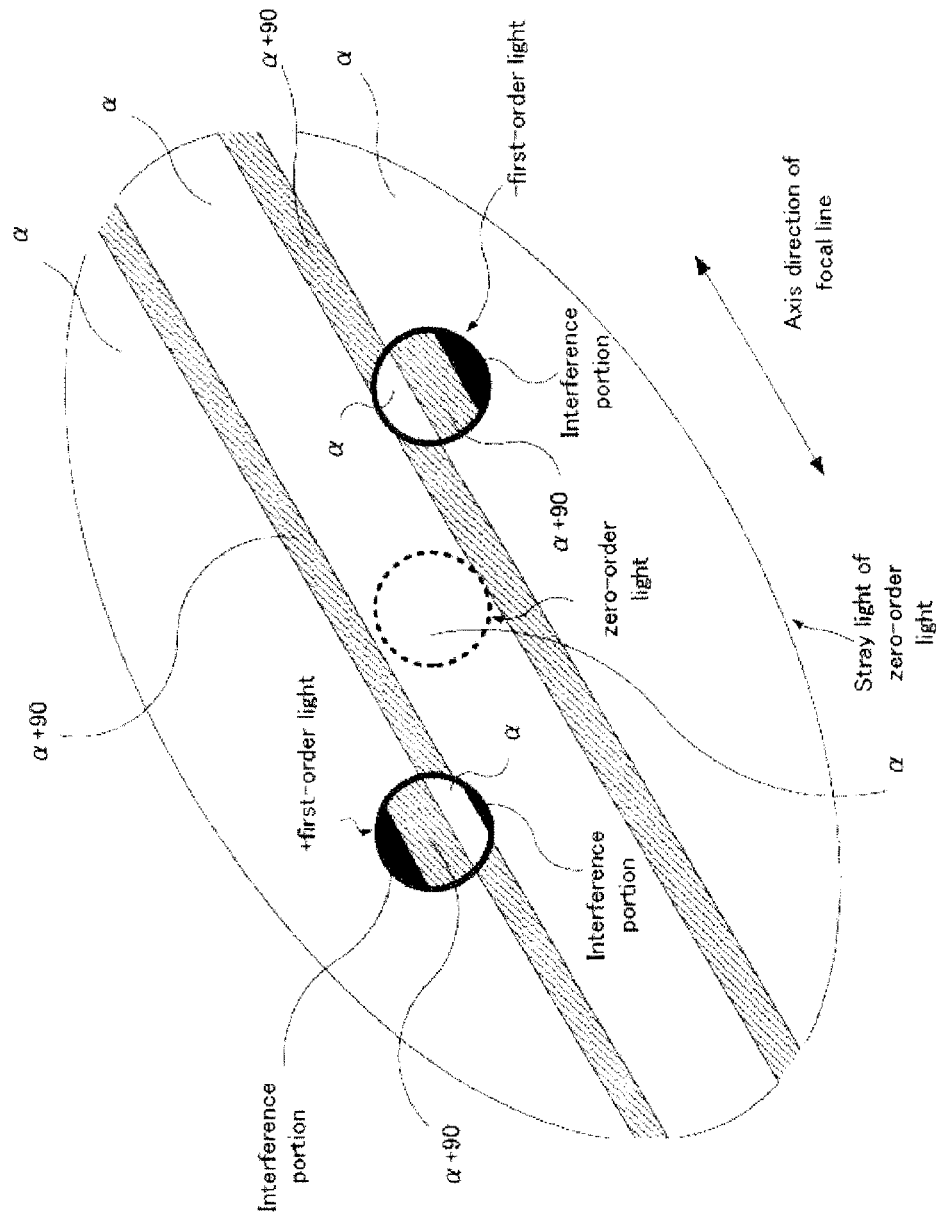
FIG. 11 is a plan view schematically showing the relative positional relationship between the optical diameter in which zero-order light is irradiated and the optical diameter in which ±first-order light is irradiated, on the light receiving surface of the first wavelength plate or the light receiving device, if a focal point is on the recording layer on the front side or on the rear side, in the embodiment.

As a result, as shown in FIG. 11, among the four areas in the optical diameter of the +first-order light, in two areas located in the central portion of the optical diameter, the influence of the light interference can be reduced effectively. Specifically, in an area hatched with diagonal lines and located in the central portion of the optical diameter of the +first-order light (refer to "α+90 degrees" in FIG. 11), the signal light of the +first-order light whose polarization direction is changed by 90 degrees, is received with the stray light of the zero-order light whose polarization direction is not changed (refer to "α degrees" in FIG. 11) (in other words, in such an image that the portion with the polarization direction of "α+90 degrees" on the front surface of the paper in FIG. 11, is combined with the portion with the polarization direction of "α degrees" on the rear surface of the paper in FIG. 11). Moreover, in a white area (refer to "α degrees" in FIG. 11) located in the central portion of the optical diameter of the +first-order light, the signal light of the +first-order light whose polarization direction is not changed, is received with the stray light of the zero-order light whose polarization direction is changed by 90 degrees (refer to "α+90 degrees" in FIG. 11) (in other words, in such an image that the portion with the polarization direction of "α degrees" on the front surface of the paper in FIG. 11, is combined with the portion with the polarization direction of "α+90 degrees" on the rear surface of the paper in FIG. 11).

As a result, it is possible to reduce the influence of the light interference, more effectively, between (i) the signal light of the +first-order light and (ii) the stray light of the zero-order light. In particular, by making the polarization directions different in the central portion of the optical diameter of the signal light, which is the largest element in determining the light intensity, it is possible to more significantly reduce the influence of the light interference by the stray light, on the light receiving device PD1 on which the signal light is received. Incidentally, in a black area (refer to "a degrees" in FIG. 11) at an area in the vicinity of the outer circumferential portion of the optical diameter of the +first-order light, the signal light of the +first-order light whose polarization direction is not changed, is received with the stray light of the zero-order light whose polarization direction is not changed (refer to "α degrees" in FIG. 11) (in other words, in such an image that the portion with the polarization direction of "α degrees" on the front surface of the paper in FIG. 11, is combined with the portion with the polarization direction of "α degrees" on the rear surface of the paper in FIG. 11), and the light interference increases. However, the vicinity of the outer circumferential portion of the optical diameter of the +first-order light is a small element in determining the light intensity.

Substantially in the same manner, as shown in FIG. 11, among the three areas in the optical diameter of the −first-order light i.e. minus first-order light, in two areas located in the central portion and the upper left portion of the optical diameter, the influence of the light interference can be reduced effectively. Specifically, in an area hatched with diagonal lines and located in the central portion of the optical diameter of the −first-order light (refer to "α+90 degrees" in FIG. 11), the signal light of the −first-order light whose polarization direction is changed by 90 degrees is received with the stray light of the zero-order light whose polarization direction is not changed (i.e. refer to "α degrees" in FIG. 11) (in other words, in such an image that the portion with the polarization direction of "α+90 degrees" on the front surface of the paper in FIG. 11, is combined with the portion with the polarization direction of "α degrees" on the rear surface of the paper in FIG. 11). Moreover, in a white area (refer to "α degrees" in FIG. 11) located in the upper left portion of the optical diameter of the −first-order light, the signal light of the −first-order light whose polarization direction is not changed, is received with the stray light of the zero-order light whose polarization direction is changed by 90 degrees (refer to "α+90 degrees" in FIG. 11) (in other words, in such an image that the portion with the polarization direction of "α degrees" on the front surface of the paper in FIG. 11, is combined with the portion with the polarization direction of "α+90 degrees" on the rear surface of the paper in FIG. 11).

As a result, it is possible to reduce the influence of the light interference, more effectively, between (i) the signal light of the −first-order light and (ii) the stray light of the zero-order light.

(4) Another Embodiment

Next, with reference to FIG. 12 to FIG. 16, an explanation will be given on the basic structure, position, and optical principle of another wavelength plate (i.e. one specific example of the "optical element" of the present invention) provided for an optical pickup in another embodiment. Incidentally, substantially the same structure as that in the aforementioned embodiment carries the same numerical reference, and the explanation thereof will be omitted.

(4-1) Basic Structure of Second Wavelength Plate

Figure 12:
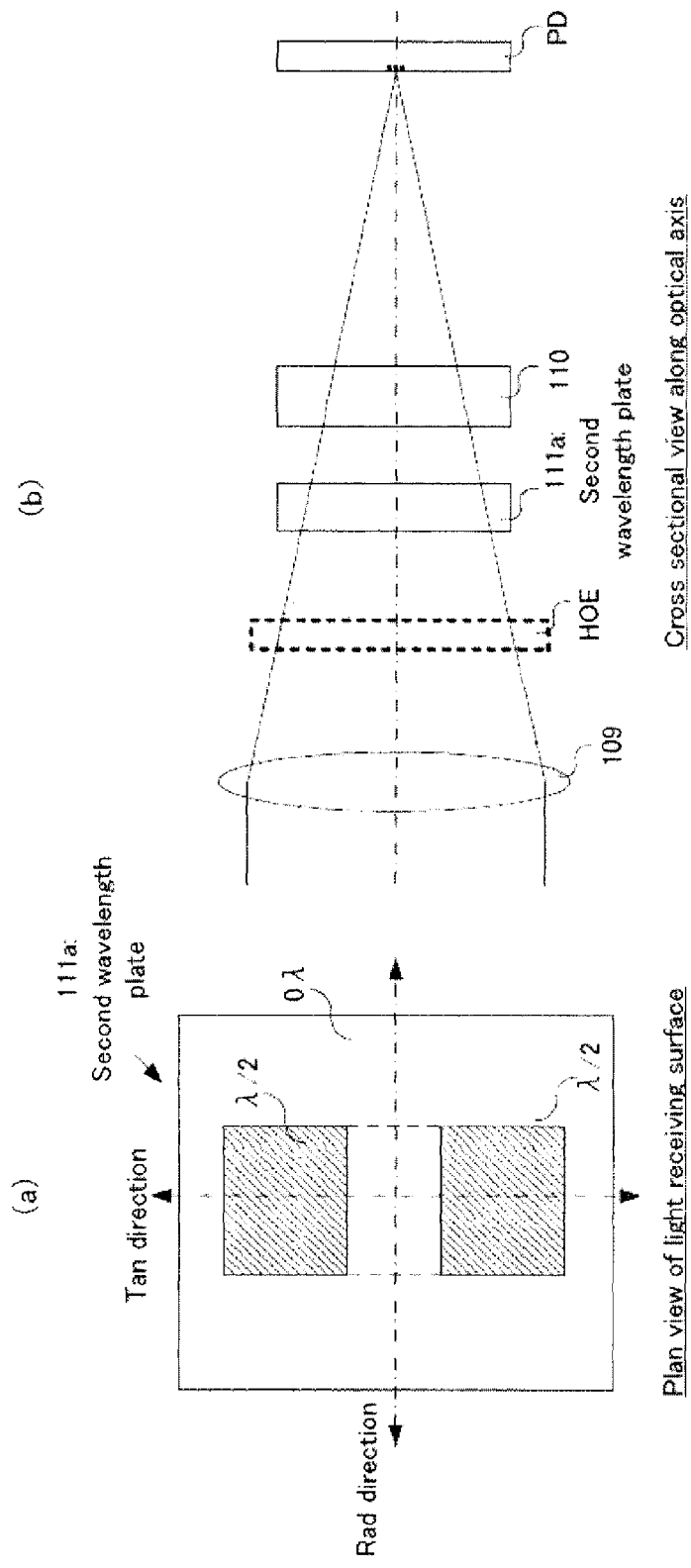
FIG. 12 are a plan view (FIG. 12(a)) schematically showing a light receiving surface of a second wavelength plate provided for the optical pickup in another embodiment, and a cross sectional view (FIG. 12(b)) schematically showing the location of the second wavelength plate.

Firstly, with reference to FIG. 12, an explanation will be given on the basic structure of a second wavelength plate provided for an optical pickup in another embodiment. FIG. 12 are a plan view (FIG. 12(a)) schematically showing the light receiving surface of the second wavelength plate provided for the optical pickup in the another embodiment, and a cross sectional view (FIG. 12(b)) schematically showing the location of the second wavelength plate.

As shown in FIG. 12(a), a second wavelength plate 111a provided for the optical pickup in the another embodiment is provided with: (i) two areas in which the polarization direction of the transmitted laser beam is changed (refer to areas "λ/2" in FIG. 12(a)); and (ii) one area in which the polarization direction of the transmitted laser beam is not changed (refer to an area "0λ" in FIG. 12(a)). The areas "λ/2" allow a predetermined amount of phase difference to be generated, in the phase of a normal light beam and in the phase of an abnormal light beam, on the basis of birefringence. Thus, the laser light transmitted through the areas "λ/2" can be changed in the polarization direction by 90 degrees, compared to the laser beam that is not transmitted through the areas "λ/2".

In addition, the two areas "λ/2" are arranged in a line-symmetric manner, on the basis of a tangent direction of the optical disc of the second wavelength plate 111a, or a Tan direction, i.e. a direction that the PD0, PD1a, and PD1b are arranged. Moreover, the two areas "λ/2" are arranged in a line-symmetric manner, on the basis of a Rad direction (so-called push-pull direction) of the second wavelength plate 111a, i.e. a direction which means the radial direction of the optical disc and a direction crossing the Tan direction at right angles. Moreover, specifically, the positional relationship of the two areas "λ/2" may be defined on the basis of the area in which the influence of the stray light described above is relatively large (e.g. the width of the dead band).

(4-2) Position of Second Wavelength Plate

Next, with reference to FIG. 12(b), an explanation will be given on the position of the second wavelength plate in the another embodiment.

As shown in FIG. 12(b), the second wavelength plate 111a provided for the optical pickup in the another embodiment, is disposed between a cylindrical lens 110 and a condenser lens 109.

Figure 13:
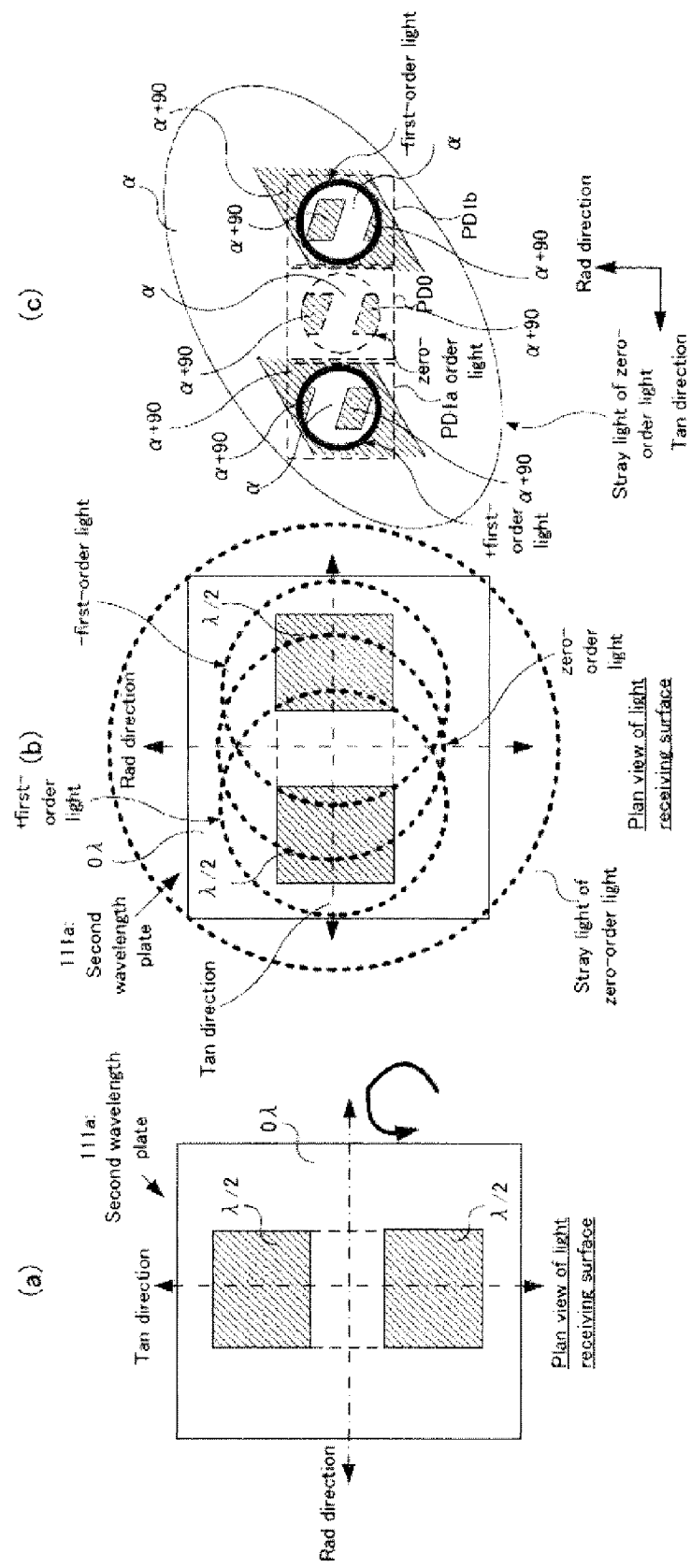
FIG. 13 are a plan view (FIG. 13(a)) schematically showing the light receiving surface of the second wavelength plate in the another embodiment, a plan view (FIG. 13(b)) schematically showing a relative positional relationship between the optical diameter in which zero-order light is irradiated and the optical diameter in which ±first-order light is irradiated, on the light receiving surface of the second wavelength plate, and a plan view (FIG. 13(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.

(4-3) Optical Principle in which Polarization Directions are Different in Signal Light and Stray Light Next, with reference to FIG. 13, an explanation will be given on the optical principle in which the polarization directions are different in the signal light and the stray light received on the light receiving device in the another embodiment. FIG. 13 are a plan view (FIG. 13(a)) schematically showing the light receiving surface of the second wavelength plate in the another embodiment, a plan view (FIG. 13(b)) schematically showing a relative positional relationship between (i) the optical diameter in which zero-order light is irradiated and (ii) the optical diameter in which ±first-order light (or ±first-order stray light) is irradiated, on the light receiving surface of the second wavelength plate, and a plan view (FIG. 13(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.

As shown in FIG. 13(a) and FIG. 13(b), the Tan direction of the second wavelength plate 111a may be substantially matched with the direction that the PD0, PD1a, and PD1b are arranged described above. Therefore, as shown in FIG. 13(b), the main portion of the optical diameter in which the signal light corresponding to the +first-order light is irradiated on the light receiving surface of the second wavelength plate 111a, is positioned on the area "λ/2" described above. Thus, the polarization direction of the main portion of the signal light corresponding to the +first-order light is changed by 90 degrees. Moreover, the main portion of the optical diameter in which the signal light corresponding to the −first-order light is irradiated, is also positioned on the area "λ/2" described above. Thus, the polarization direction of the main portion of the signal light corresponding to the −first-order light is also changed by 90 degrees. Moreover, the optical diameter (e.g. light spot) in which the central portion of the signal light corresponding to the zero-order light is irradiated, is also positioned covering the two areas "λ/2", on the basis of the center of the Tan direction and the Rad direction of the area "0λ". Thus, the polarization direction of the central portion of the signal light corresponding to the zero-order light is not changed.

Therefore, as shown in FIG. 13(c), on the light receiving device PD1a, the signal light of the +first-order light whose polarization direction is not changed(refer to "α degrees" in FIG. 13(c)) is received with the stray light of the zero-order light whose polarization direction is changed by 90 degrees (refer to "α+90 degrees" and the shaded part of the inside of a diamond in FIG. 13(c)). Substantially in the same manner, on the light receiving device PD1b, the signal light of the −first-order light whose polarization direction is not changed (refer to "α degrees" in FIG. 13(c)) is received with the stray light of the zero-order light whose polarization direction is changed by 90 degrees(refer to "α+90 degrees" and the shaded parts of inside of a circle in FIG. 13(c)). Incidentally, the two long and thin diamond areas in FIG. 13(c) indicate portions in which the polarization direction is changed by 90 degrees in the stray light of the zero-order light.

As a result, as compared to the first wavelength plate, it is possible to effectively reduce the influence of the light interference between (i) the signal light of the +first-order light (or the signal light of −first-order light) and (ii) the stray light of the zero-order light, in which the polarization directions are different, using the second wavelength plate 111a constituted from the large areas "λ/2". In particular, compared to the first wavelength plate, it is possible to reduce a necessity for small parts and precision work in order to design the second wavelength plate to be provided with the areas "λ/2". Thus, it is possible to simplify the process of manufacturing the wavelength plate.

(4-4) Basic Structure of Third Wavelength Plate

Figure 14:
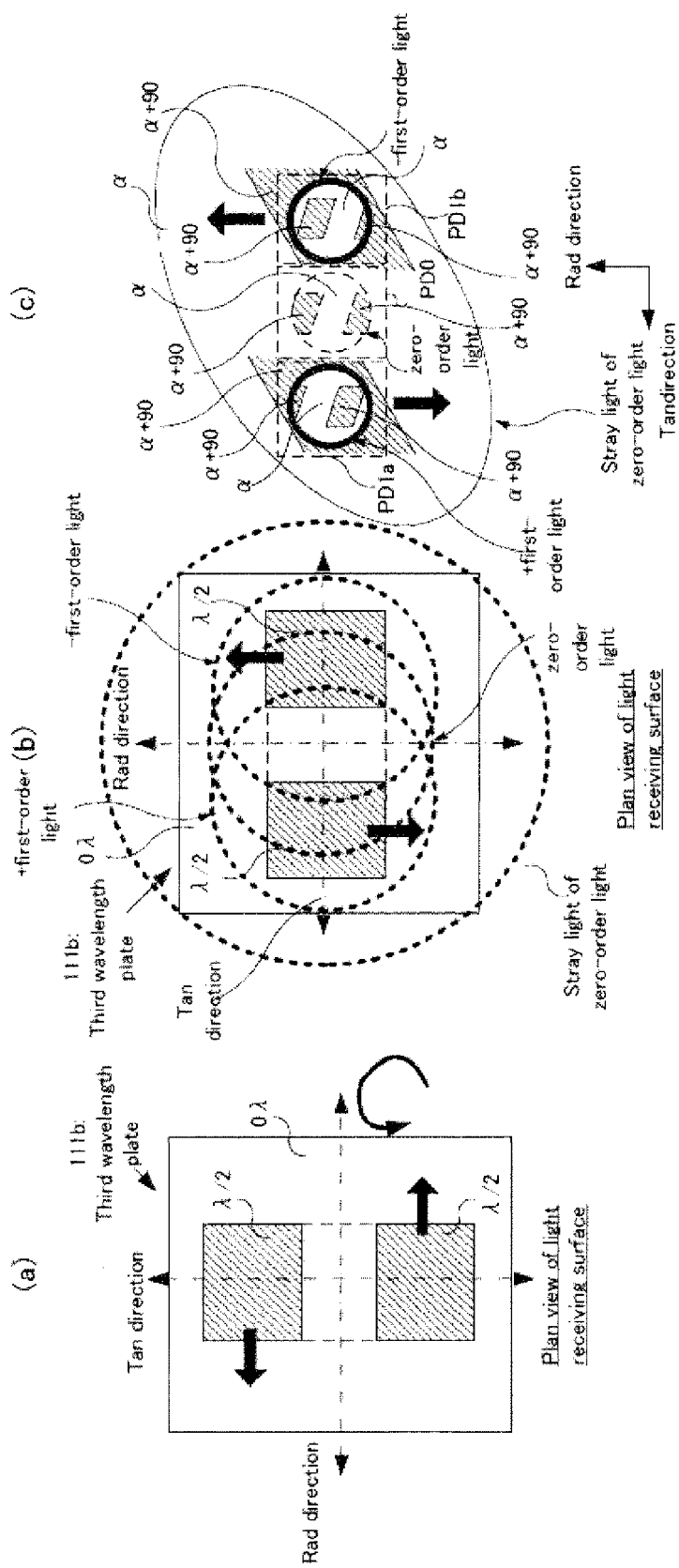
FIG. 14 are a plan view (FIG. 14(a)) schematically showing a light receiving surface of a third wavelength plate in another embodiment, a plan view (FIG. 14(b)) schematically showing a relative positional relationship between the optical diameter in which zero-order light is irradiated and the optical diameter in which ±first-order light is irradiated, on the light receiving surface of the third wavelength plate, and a plan view (FIG. 14(c)) schematically showing a relative positional relationship among the optical diameter in which zero-order light is irradiated, the optical diameter in which ±first-order light is irradiated, and the optical diameter in which zero-order stray light is irradiated, on the light receiving surface of the light receiving device.
Figure 15:
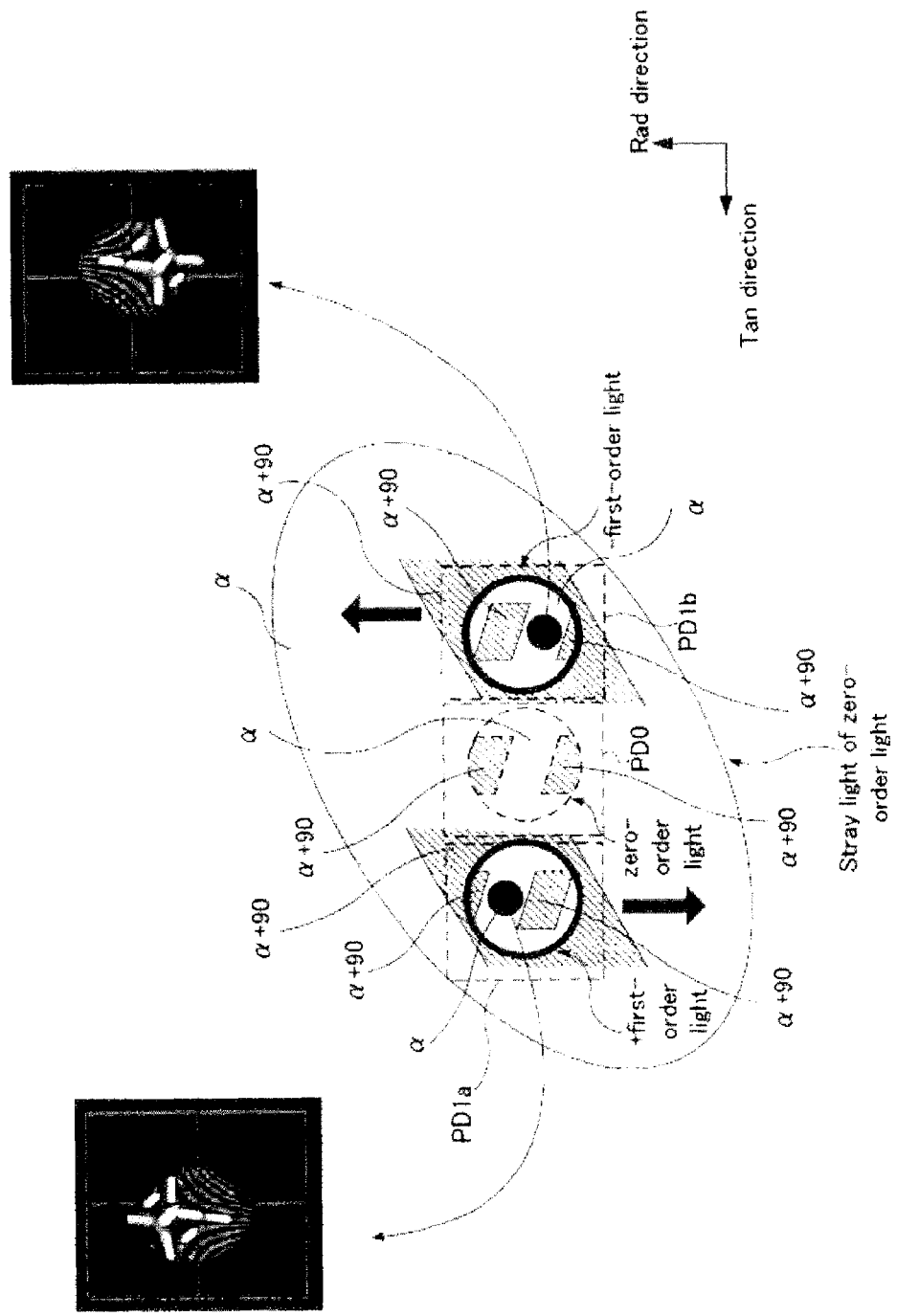
FIG. 15 is a plan view schematically showing a relative positional relationship among zero-order light, ±first-order, the optical diameter in which the zero-order light is irradiated, and the center of the light interference, on the light receiving surface of the light receiving device, in the another embodiment.
Figure 16:
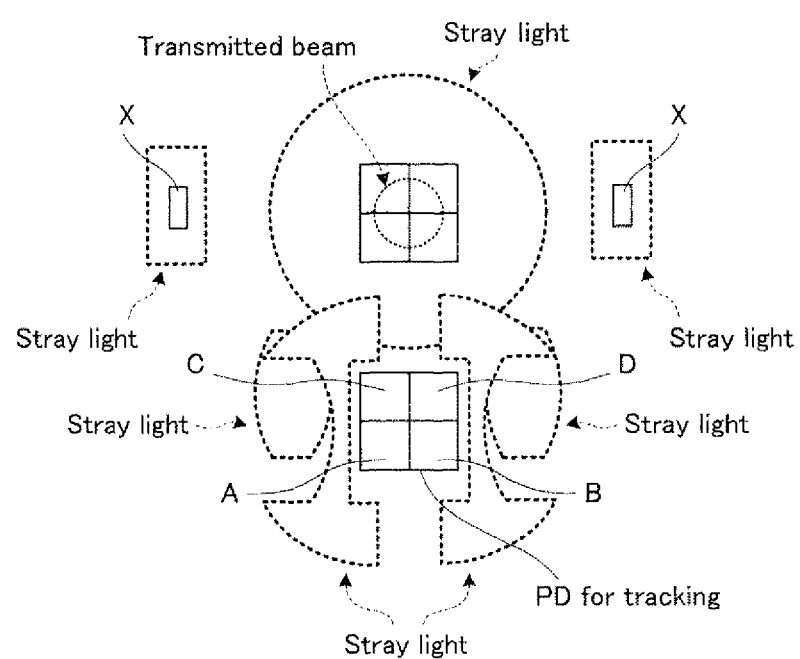
FIG. 16 is a plan view showing a relative positional relationship between a light receiving device and a optical diameter in a comparison example

Next, with reference to FIG. 14, an explanation will be given on the basic structure of a third wavelength plate provided for an optical pickup in another embodiment, and the optical principle in which the polarization directions are different in the signal light and the stray light, which are received on the light receiving device. FIG. 14 are a plan view (FIG. 14(a)) schematically showing the light receiving surface of the third wavelength plate in another embodiment, a plan view (FIG. 14(b)) schematically showing a relative positional relationship between (i) the optical diameter in which the zero-order light is irradiated and (ii) the optical diameter in which ±first-order light or ±first-order stray light is irradiated, on the light receiving surface of the third wavelength plate, and a plan view (FIG. 14(c)) schematically showing a relative positional relationship among the optical diameter in which the zero-order light is irradiated, the optical diameter in which the ±first-order light is irradiated, and the optical diameter in which the zero-order stray light is irradiated, on the light receiving surface of the light receiving device. FIG. 15 is a plan view schematically showing a relative positional relationship between (i) the optical diameter in which the zero-order light, the first-order, and the zero-order light of the stray light are irradiated and (ii) the center of the light interference, on the light receiving surface of the light receiving device, in the another embodiment.

As shown in FIG. 14(a) and FIG. 14(b), a third wavelength plate 111b has substantially the same basic structure and position as those of the second wavelength plate 111a described above. In particular, the shape of one of the two areas "λ/2" in the third wavelength plate 111b above mentioned may be designed to be shifted or elongated toward one side of the Rad direction. In addition, the shape of the other of the two areas "λ/2" may be designed to be shifted or elongated toward the other side of the Rad direction. Therefore, as shown in FIG. 14(c), the signal light of the +first-order light whose polarization direction is not changed (refer to "α degrees" in FIG. 14(c)) is received with the stray light of the zero-order light whose polarization direction is changed by 90 degrees(refer to "α+90 degrees" and the shaded part of inside of a diamond in FIG. 14(c)). Substantially in the same manner, on the light receiving device PD 1b, the signal light of the −first-order light whose polarization direction is not changed (refer to "α degrees" in FIG. 14(c)) is received with the stray light of the zero-order light whose polarization direction is changed by 90 degrees(refer to "α+90 degrees" and the shaded parts of inside of a circle in FIG. 14(c)). In particular, the two long and thin diamond areas in FIG. 14(c) indicate portions in which the polarization direction is changed by 90 degrees in the stray light of the zero-order light while the two diamond areas are separately positioned in the Rad direction.

Specifically, as shown in a black circle on the left side of FIG. 15, it is possible to include the portion in which the level of the light interference is relatively high, in the area in which the signal light of the +first-order light whose polarization direction is not changed (refer to "α degrees" in FIG. 15) is received with the stray light of the zero-order light whose polarization direction is changed by 90 degrees (refer to "α+90 degrees" and the shaded part of inside of a diamond in FIG. 15) on the light receiving device PD1a, on the basis of a light interference pattern. Alternatively, as shown in a black circle on the right side of FIG. 15, it is possible to include the portion in which the level of the light interference is relatively high, in the area in which the signal light of the +first-order light whose polarization direction is not changed (refer to "α degrees" in FIG. 15) is received with the stray light of the zero-order light whose polarization direction is changed by 90 degrees (refer to "α+90 degrees" and the inside of a shaded parts inside of a circle in FIG. 15) on the light receiving device PD1b, on the basis of the light interference pattern.

As a result, it is possible to effectively reduce the influence of the light interference between (i) the signal light of the +first-order light (or the signal light of −first-order light) and (ii) the stray light of the zero-order light, in which the polarization directions are different, using the third wavelength plate 111b having the areas "λ/2" whose position is defined. In particular, compared to the second wavelength plate, the structure of the third wavelength plate is defined in proper response to the portion in which the level of the light interference is relatively high, so that it is possible to reduce the influence of the light interference, more effectively. Incidentally, as shown in FIG. 12 described above, for example, a hologram element HOE or the like may be provided, in order to change the various features of the laser beam (e.g. focal length or the like).

The present invention is not limited to the aforementioned embodiments, but various changes may be made, if desired, without departing from the essence or spirit of the invention which can be read from the claims and the entire specification. An optical pickup and information equipment, all of which involve such changes, are also intended to be within the technical scope of the present invention.

INDUSTRIAL APPLICABILITY

The optical pickup and the information equipment of the present invention can be applied to an optical pickup for irradiating an information recording medium, such as a DVD, with a laser beam when an information signal is recorded or reproduced, and information equipment provided with the optical pickup.

The invention claimed is:

1. An optical pickup for recording or reproducing an information signal with respect to an optical disc comprising a plurality of recording layers, each recording layer having a recording track in which information pits are arranged, the information signal being recorded in the information pits, the optical pickup comprising:

a light source for irradiating a laser beam;

a diffracting device for diffracting the irradiated laser beam;

an optical system for guiding the diffracted laser beam to one recording layer of the plurality of recording layers;

an optical element for changing (i) a polarization direction in at least one portion of signal light generated in the one recording layer and (ii) a polarization direction in at least one portion of stray light generated in another recording layer of the plurality of recording layers, if the guided laser beam is focused on the one recording layer; and a plurality of light receiving devices for respectively receiving zero-order light, +first-order diffraction light and −first-order diffraction light, wherein one portion of the optical element sets the polarization direction in the one portion of the signal light and the one portion of the stray light to a first direction, and another portion of the optical element sets the polarization direction in another portion of the signal light and another portion of the stray light to a second direction, the light receiving devices are arranged so as to receive the one portion of the signal light with the another portion of the stray light, shapes of the one portion and the another portion of the optical element and a relative positional relationship between the one portion and the another portion of the optical element are defined on the basis of a width of a dead band which reduces an influence of a light interference of the signal light and the stray light, in an optical diameter of the signal light, and the optical element is disposed in a position in which optical diameters of a plurality of stray lights, generated in a plurality of recording layers other than the one recording layer, are all substantially equal, on an optical axis.

2. The optical pickup according to claim 1, wherein the signal light is signal light of zero-order light or signal light of ±first-order diffraction light, and the stray light is stray light of zero-order light or stray light of ±first-order diffraction light.

3. The optical pickup according to claim 1, wherein the first direction and the second direction are dissimilar in polarization direction by 90 degrees.

4. The optical pickup according to claim 1, wherein either the one portion of the optical element or the another portion of the optical element is a λ/2 wavelength plate.

5. The optical pickup according to claim 1, wherein the optical element is disposed on an optical path in which return light, which is generated in the plurality of recording layers, is guided to the light receiving devices.

6. The optical pickup according to claim 1, wherein the optical element is disposed in a vicinity of a position on an irradiation side, of two focal lines of the signal light based on an astigmatic method.

7. The optical pickup according to claim 1, wherein shapes of the one portion and the another portion of the optical element and a relative positional relationship between the one portion and the another portion of the optical element are defined on the basis of (i-1) an optical diameter or optical magnification of the signal light corresponding to zero-order light on a plane perpendicular to an optical axis and (i-2) an optical diameter or optical magnification of the stray light, (ii-1) an optical diameter, a beam position, or optical magnification of the signal light corresponding to ±first-order light on the plane perpendicular to the optical axis, and (ii-2) an optical diameter, a beam position, or optical magnification of the stray light.

8. The optical pickup according to claim 1, wherein shapes of the one portion and the another portion of the optical element and a relative positional relationship between the one portion and the another portion of the optical element are defined on the basis of an interference pattern between the signal light and the stray light on the light receiving devices.

9. The optical pickup according to claim 8, wherein the optical pickup further comprises a cylindrical lens for performing an astigmatic method, and the optical element is defined on the basis of the interference pattern on the light receiving devices, which is specified by (i) an angle between a diffraction direction of a +first-order light component of the signal light and a diffraction direction of a −first-order light component of the signal light and (ii) a cylinder direction of the cylindrical lens.

10. The optical pickup according to claim 1, wherein the optical element has at least two of the one portion of the optical element and at least two of the another portion of the optical element, which have a linear-symmetric positional relationship on the basis of a direction of a focal line corresponding to zero-order light.

11. The optical pickup according to claim 1, wherein the optical element has at least two of the one portion of the optical element and at least two of the another portion of the optical element, which have a linear-symmetric positional relationship on the basis of a direction for light-receiving a push-pull signal.

12. The optical pickup according to claim 1, wherein the optical pickup further comprises a hologram element for at least changing a focal position of the signal light or a focal position of the stray light, and the hologram element changes the focal position such that (i) the one portion of the signal light and the another portion of the stray light or (ii) the another portion of the signal light and the one portion of the stray light are received together by the light receiving devices.

13. The optical pickup according to claim 1, wherein the optical element makes the polarization direction of the signal light corresponding to ±first-order diffraction light, be different from the polarization direction of the stray light corresponding to zero-order light, and among (i) a first light receiving device for receiving the zero-order light, (ii) a second light receiving device for receiving a +first-order diffraction light, and (iii) a third light receiving device for receiving a −first-order diffraction light, the light receiving devices include at least the second light receiving device and the third light receiving device.

14. The optical pickup according to claim 1, further comprising a controlling device for controlling the optical system to guide the laser beam to the recording track provided for the one recording layer, on the basis of the received signal light.

15. An information equipment comprising:

an optical pickup; and a recording/reproducing device for irradiating an optical disc with a laser beam, to thereby perform a recording or reproduction of an information signal, wherein the optical pickup is for recording or reproducing the information signal with respect to the optical disc comprising a plurality of recording layers, each recording layer having a recording track in which information pits are arranged, the information signal being recorded in the information pits, the optical pickup comprising:

a light source for irradiating a laser beam;

a diffracting device for diffracting the irradiated laser beam;

an optical system for guiding the diffracted laser beam to one recording layer of the plurality of recording layers;

an optical element for changing (i) a polarization direction in at least one portion of signal light generated in the one recording layer and (ii) a polarization direction in at least one portion of stray light generated in another recording layer of the plurality of recording layers, if the guided laser beam is focused on the one recording layer; and a plurality of light receiving devices for respectively receiving zero-order light, +first-order diffraction light and −first-order diffraction light, wherein one portion of the optical element sets the polarization direction in the one portion of the signal light and the one portion of the stray light to a first direction, and another portion of the optical element sets the polarization direction in another portion of the signal light and another portion of the stray light to a second direction, the light receiving devices are arranged so as to receive the one portion of the signal light with the another portion of the stray light, shapes of the one portion and the another portion of the optical element and a relative positional relationship between the one portion and the another portion of the optical element are defined on the basis of a width of a dead band which reduces an influence of a light interference of the signal light and the stray light, in an optical diameter of the signal light, and the optical element is disposed in a position in which optical diameters of a plurality of stray lights, generated in a plurality of recording layers other than the one recording layer, are all substantially equal, on an optical axis.

* * * * *